United States Patent
Ye et al.

(10) Patent No.: US 10,277,909 B2
(45) Date of Patent: Apr. 30, 2019

(54) SINGLE LOOP DECODING BASED INTERLAYER PREDICTION

(71) Applicant: Vid Scale, Inc., Wilmington, DE (US)

(72) Inventors: Yan Ye, San Diego, CA (US); Xiaoyu Xiu, San Diego, CA (US); Yong He, San Diego, CA (US); Yuwen He, San Diego, CA (US); Jie Dong, San Diego, CA (US); Eun Seok Ryu, Seoul (KR)

(73) Assignee: VID SCALE, Inc., Wilmington, DE (US)

( * ) Notice: Subject to any disclaimer, the term of this patent is extended or adjusted under 35 U.S.C. 154(b) by 151 days.

(21) Appl. No.: 14/891,100

(22) PCT Filed: May 15, 2014

(86) PCT No.: PCT/US2014/038136
§ 371 (c)(1),
(2) Date: Nov. 13, 2015

(87) PCT Pub. No.: WO2014/186542
PCT Pub. Date: Nov. 20, 2014

(65) Prior Publication Data
US 2016/0094853 A1    Mar. 31, 2016

Related U.S. Application Data

(60) Provisional application No. 61/823,839, filed on May 15, 2013, provisional application No. 61/839,726, (Continued)

(51) Int. Cl.
*H04N 19/34* (2014.01)
*H04N 19/44* (2014.01)
(Continued)

(52) U.S. Cl.
CPC ............. *H04N 19/33* (2014.11); *H04N 19/34* (2014.11); *H04N 19/44* (2014.11); *H04N 19/59* (2014.11); *H04N 19/593* (2014.11); *H04N 19/61* (2014.11)

(58) Field of Classification Search
CPC ................................................... H04N 19/33
See application file for complete search history.

(56) References Cited

U.S. PATENT DOCUMENTS 7,840,078 B2 * 11/2010 Segall .................... H04N 19/40
382/232
8,085,852 B2 * 12/2011 Liu ....................... H04N 19/105
358/1.9
(Continued)

FOREIGN PATENT DOCUMENTS

WO    WO 2014/165721    10/2014

OTHER PUBLICATIONS

Hyomin Choi, Scalable structures and inter-layer predictions for HEVC scalable extension, Jul. 2011.*
(Continued)

*Primary Examiner* — Jayanti K Patel
*Assistant Examiner* — Ifran Habib
(74) *Attorney, Agent, or Firm* — Condo Roccia Koptiw LLP

(57) ABSTRACT

Methods, systems, and instrumentalities are described to implement single loop decoding, A video decoding device (VDD) may receive a video bitstream, which may include one or more bitstreams (e.g., base layer bitstream, enhanced layer bitstream, etc.) The VDD may generate a hybrid inter-layer reference (H-ILR) picture. The H-ILR picture may be generated based on one or more inputs including, for example, a first layer motion information, a processed (e.g., upsampled) first layer residue signal, a second layer texture
(Continued)

information, etc. The first layer motion information may be derived from a compressed first layer motion field or an uncompressed first layer motion field. An H-ILR block of the H-ILR picture may be reconstructed by deriving motion information of the H-ILR block from one or more neighboring H-ILR blocks in the H-ILR picture, for example, when the neighboring blocks are inter-coded.

20 Claims, 16 Drawing Sheets

Related U.S. Application Data filed on Jun. 26, 2013, provisional application No. 61/889,715, filed on Oct. 11, 2013.

(51) Int. Cl.
*H04N 19/59* (2014.01)
*H04N 19/33* (2014.01)
*H04N 19/593* (2014.01)
*H04N 19/61* (2014.01)

(56) References Cited

U.S. PATENT DOCUMENTS

| | | | | |
|---|---|---|---|---|
| 8,477,853 B2* | 7/2013 | Wu | H04N 19/30 | 375/240.25 |
| 8,532,176 B2* | 9/2013 | Segall | H04N 19/40 | 375/240.11 |
| 8,576,907 B2* | 11/2013 | Demos | H04N 19/196 | 375/240.03 |
| 8,743,969 B2* | 6/2014 | Sasai | H04N 19/197 | 375/240.26 |
| 8,867,618 B2* | 10/2014 | Pandit | H04N 19/51 | 375/240.16 |
| 8,907,823 B2* | 12/2014 | Marpe | H03M 7/4006 | 341/107 |
| 8,934,542 B2* | 1/2015 | Wiegand | H04N 19/30 | 375/240.12 |
| 9,030,579 B2* | 5/2015 | Yasuda | H04N 5/367 | 348/246 |
| 9,172,970 B1 | 10/2015 | Maaninen | H04N 19/51 | |
| 9,313,493 B1* | 4/2016 | Maaninen | H04N 19/176 | |
| 9,351,009 B2* | 5/2016 | Deshpande | H04N 19/503 | |
| 9,648,319 B2* | 5/2017 | Seregin | H04N 19/30 | |
| 9,654,774 B2* | 5/2017 | Hendry | H04N 19/105 | |
| 9,756,353 B2* | 9/2017 | Ye | H04N 19/36 | |
| 9,900,593 B2* | 2/2018 | Xiu | H04N 19/52 | |
| 2004/0258155 A1* | 12/2004 | Lainema | H04N 19/147 | 375/240.16 |
| 2006/0133484 A1* | 6/2006 | Park | H04N 19/105 | 375/240.08 |
| 2007/0211798 A1* | 9/2007 | Boyce | H04N 19/61 | 375/240.16 |
| 2007/0230564 A1* | 10/2007 | Chen | H04N 21/234327 | 375/240.01 |
| 2007/0230575 A1* | 10/2007 | Han | H04N 19/176 | 375/240.13 |
| 2008/0008394 A1* | 1/2008 | Segall | H04N 19/176 | 382/238 |
| 2008/0089417 A1* | 4/2008 | Bao | H04N 19/176 | 375/240.16 |
| 2008/0193032 A1* | 8/2008 | Segall | H04N 19/176 | 382/251 |
| 2009/0003445 A1* | 1/2009 | Ying | H04N 19/105 | 375/240.15 |
| 2009/0097558 A1* | 4/2009 | Ye | H04N 19/176 | 375/240.13 |
| 2009/0110073 A1* | 4/2009 | Wu | H04N 19/30 | 375/240.15 |
| 2009/0225869 A1* | 9/2009 | Cho | H04N 19/105 | 375/240.26 |
| 2010/0135393 A1* | 6/2010 | Ying Gao | H04N 19/61 | 375/240.15 |
| 2010/0220789 A1* | 9/2010 | Yuwen | H04N 19/61 | 375/240.16 |
| 2011/0090959 A1* | 4/2011 | Wiegand | H04N 19/593 | 375/240.12 |
| 2011/0103472 A1* | 5/2011 | Lefebvre | H04N 21/4122 | 375/240.12 |
| 2011/0255589 A1* | 10/2011 | Saunders | H04N 19/176 | 375/240.01 |
| 2012/0070081 A1* | 3/2012 | Lukac | H04N 5/367 | 382/167 |
| 2012/0236929 A1* | 9/2012 | Liu | H04N 19/46 | 375/240.02 |
| 2013/0148029 A1* | 6/2013 | Gish | G09G 5/02 | 348/708 |
| 2013/0187798 A1* | 7/2013 | Marpe | H03M 7/4081 | 341/67 |
| 2013/0243100 A1* | 9/2013 | Liu | H04N 19/105 | 375/240.25 |
| 2013/0279577 A1* | 10/2013 | Schwarz | H04N 19/50 | 375/240.12 |
| 2013/0300591 A1* | 11/2013 | Marpe | H03M 7/40 | 341/67 |
| 2014/0140399 A1* | 5/2014 | Seregin | H04N 19/105 | 375/240.12 |
| 2014/0254681 A1* | 9/2014 | Aminlou | H04N 19/105 | 375/240.16 |
| 2014/0341273 A1* | 11/2014 | Ye | H04N 19/36 | 375/240.02 |

OTHER PUBLICATIONS

Bross et al., "High Efficiency Video Coding (HEVC) Text Specification Draft 10 (for FDIS & Consent)", JCTVC-L1003, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.

Chang et al., "Multi-View Image Compression and Intermediate View Synthesis for Stereoscopic Applications", ISCAS 2000—IEEE International Symposium on Circuits and Systems, Geneva, Switzerland, May 28-31, 2000, pp. 277-280.

Chen et al., "SHVC Draft 3", JCTVC-N1008, 14th Meeting: Vienna, AT, Jul. 25-Aug. 2, 2013, 71 pages.

Chen et al., "SHVC Test Model 1 (SHM 1)", JCT-VC of ITU-T SG16 WP3 and ISO/IEC JTC1/SC29/WG11, 12th Meeting: Geneva, CH, Jan. 14-23, 2013, 41 pages.

Chen et al., "SHVC Workding Draft 2", JCTVC-M1008, 13th Meeting: Incheon, KR, Apr. 18-26, 2013, 53 pages.

Dong et al., "Description of Scalable Video Coding Technology Proposal by InterDigital Communications", InterDigital Communications, LLC, JCTVC-K0034, Joint Collaborative Team on Video Coding (JCT-VC) of ITU-T SG16 WP3 and ISO/IEC JTC1/SC29/WG11, 11th Meeting: Shanghai, CN, Oct. 10-19, 2012, pp. 1-30.

Hannuksela et al., "MV-HEVC/SHVC HLS: On Inter-Layer Sample and Syntax Prediction Indications (Combining Aspects of JCTVC-M0205 and JCTVC-M0046)", JCTVC-M0457, 13th Meeting: Incheon, KR, Apr. 18-26, 2013, 8 pages.

ISO/IEC, "Information Technology—Coding of Audio-Visual Objects", International Standard, Part2: Visual, ISO/IEC 14496-2, Dec. 2001, 536 pages.

ISO/IEC, "Information Technology—Coding of Moving Pictures and Associated Audio for Digital Storage Media at up to About 1,5 Mbit/s—Part 2: Video", ISO/IEC 11172-2:1993, Nov. 2003, 6 pages.

ISO/IEC, "Information Technology—Generic Coding of Moving Pictures and Associated Audio Information: Video", ISO/IEC 13818-2, Dec. 2000, 12 pages.

ISO/IEC, "Joint Call for Proposals on Scalable Video Coding Extensions of High Efficiency Video Coding (HEVC)", ISO/IEC JTC 1/SC 29/WG 11 and ITU-T SG 16 WP 3, ISO/IEC JTC1/SC29/WG11 N12957, Stockholm, Sweden, Jul. 2012, 11 pages.

(56) References Cited

OTHER PUBLICATIONS

ISO/IEC, "SCE4: Summary Report of SHVC Core Experiment on Inter-Layer Filtering", JCTVC-M0024, Apr. 2013.

ITU, "Codec for Audiovisual services at px384kbit/s", Series H: Audiovisual and Multimedia Systems, Coding of Moving video, CCITT, H.261, Nov. 1988, 14 pages.

ITU, "Video Coding for Low Bit Rate Communication", Transmission of Non-Telephone Signals, International Telecommunication Union, ITU-T Rec H.263, Mar. 1996, 52 pages.

ITUT-T, "Advanced Video Coding for Generic Audiovisual Services", ITU-T Rec H.264 and ISO/IEC/MPEG 4 part 10, Section 8.3, Nov. 2007, 563 pages.

Li et al., "TE3: Results of Test 4.6.2.1 on Generalized Residual Prediction", Joint Collaborative Team on Video Coding (JCT-VC) of ITU-T SG 16 WP 3 and ISO/IEC JTC 1/SC 29/WG 11, 12th Meeting: Geneva, CH, JCTVC-L0078, Jan. 14-23, 2013, pp. 1-8.

Luthra et al., "Requirements of the Scalable Enhancement of HEVC", WG11 Requirements and Video, ISO/IEC JTC1/SC29/WG11 N12956, Stockholm, Sweden, Jul. 2012, 12 pages.

Luthra et al., "Use Cases of the Scalable Enhancement of HEVC", N12955, WG11 Requirements and Video, Stockholm, Sweden, Jul. 2012, 8 pages.

Schwarz et al., "Overview of the Scalable Video Coding Extension of the H.264/AVC Standard", IEEE Transactions on Circuits and Systems for Video Technology, vol. 17, No. 9, Sep. 2007, pp. 1-18.

Sullivan et al., "Meeting Report of the 13th Meeting of the Joint Collaborative Team on Video Coding (JCT-VC), Incheon, KR, Apr. 18-26, 2013", JCTVC-M_Notes_d9, Apr. 18-26, 2013, 156 pages.

Sullivan et al., "Rate-Distortion Optimization for Video Compression", Signal Processing Magazine, IEEE, vol. 15, No. 6, Nov. 1998, pp. 74-90.

Vetro et al., "Overview of the Stereo and Multiview Video Coding Extensions of the H.264/MPEG-4 AVC Standard", Mitsubishi Electric Research Laboratories, Proceedings of IEEE, Jan. 2011, 17 pages.

Xiu et al., "TE C5: Motion Field Mapping", InterDigital Communications, LLC, Joint Collaborative Team on Video Coding (JCT-VC) of ITU-T SG 16 WP 3 and ISO/IEC JTC 1/SC 29/WG 11, 12th Meeting: Geneva, CH, JCTVC-L0052, Jan. 14-23, 2013, 6 pages.

Chen et al., "SHVC Draft Text 1", JCTVC-L1008, 12th Meeting: Geneva, CH, Jan. 14-23, 2013, 34 pages.

* cited by examiner

SINGLE LOOP DECODING BASED INTERLAYER PREDICTION

CROSS-REFERENCE TO RELATED APPLICATIONS

This application claims the benefit of U.S. Provisional Patent Application No. 61/823,839, filed May 15, 2013; U.S. Provisional Patent Application No. 61/839,726, filed Jun. 26, 2013; and U.S. Provisional Patent Application No. 61/889,715, filed Oct. 11, 2013.

BACKGROUND

As video applications are being implemented on smartphones and other wireless transmit/receive units (WTRUs), video consumption may be accommodated on devices with widely varying capabilities (e.g., in terms of computing power, memory/storage size, display resolution, display frame rate, etc.). The network and/or transmission channels may have widely varying characteristics (e.g., in terms of packet loss rate, available channel bandwidth, burst error rate, etc.). The video data may be transmitted over wired networks and/or wireless networks.

Scalable video coding may improve the quality of experience for video applications running on devices with different capabilities over heterogeneous networks. Scalable systems may provide multi-layer processing. The inter-layer processing in the multi-layer processing systems may be complex.

SUMMARY

Methods, systems, and instrumentalities are described to implement a decoding method. A video decoding device (VDD) may receive a video bitstream, which may include one or more bitstreams (e.g., base layer bitstream, enhanced layer bitstream, etc.). The VDD may generate a hybrid inter-layer reference (H-ILR) picture. The H-ILR picture may be generated based on one or more inputs including, for example, a first layer motion information, a processed (e.g., upsampled) first layer residue signal, a second layer texture information, etc. The first layer may be a base layer and the second layer may be an enhancement layer. The VDD may store the generated H-ILR picture in a second layer decoded picture buffer (DPB).

The VDD may parse a first layer bitstream, de-quantize a first layer residual, e.g., by applying an inverse quantization, and/or apply an inverse transform to the de-quantized first layer residual.

The VDD may derive the first layer motion information from a compressed first layer motion field or an uncompressed first layer motion field. The VDD may reconstruct an H-ILR block of the H-ILR picture by deriving motion information of the H-ILR block from one or more neighboring H-ILR blocks in the H-ILR picture. The VDD may reconstruct an H-ILR block, for example, when the first layer motion information is derived from a compressed first layer motion field and/or the neighboring blocks to the H-ILR block are inter-coded.

BRIEF DESCRIPTION OF THE DRAWINGS

A more detailed understanding may be had from the following description, given by way of example in conjunction with the accompanying drawings.

DETAILED DESCRIPTION

Figure 1:
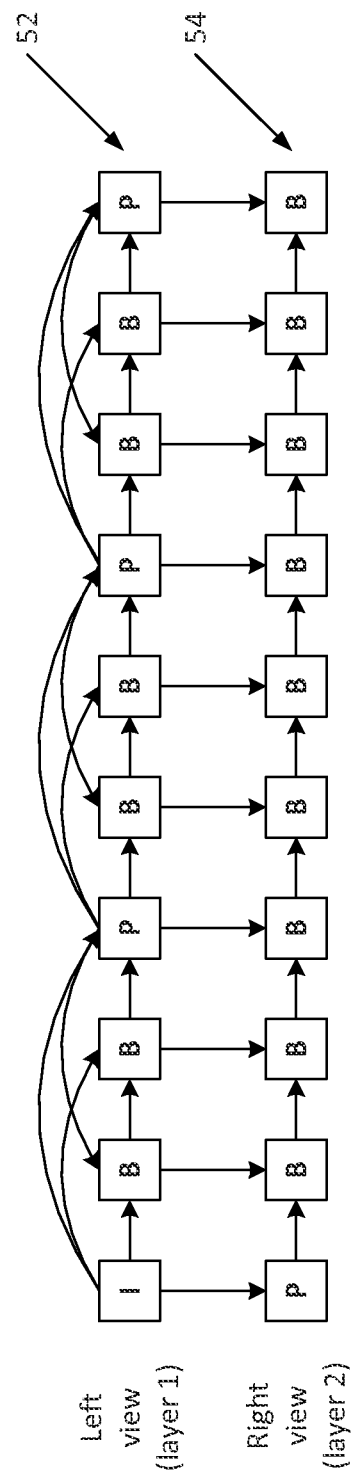
FIG. 1 is a diagram illustrating an example of temporal inter-layer prediction for stereoscopic video coding using multiple layer video coding (MVC).

A detailed description of illustrative embodiments may be described with reference to the various figures. Although this description provides a detailed example of possible implementations, it should be noted that the details are intended to be examples and in no way limit the scope of the application.

Various digital video compression technologies tray be used to enable efficient digital video communication, distribution, and/or consumption. Examples of commercially deployed standards for such digital video may include ISO/IEC and ITU-T, such as H.261, MPEG-1, MPEG-2, H.263, MPEG-4 part 2, H.264/MPEG-4 part 10 AVC, and/or High Efficiency Video Coding (HEVC) (e.g., which may be jointly developed by ITU-T Video Coding Experts Group (VCEG) and ISO/IEC Moving Picture Experts Group (MPEG)). HEVC may be used to achieve greater compression (e.g., twice as much compression as H.264/AVC), and/or less bit rate (e.g., half the bit rate) in the same, or similar, video quality.

Digital video services may be implemented via TV services over satellite, cable, terrestrial broadcasting channels, the Internet (e.g., on mobile devices, such as smart phones, tablets, and/or other WTRUs) and/or other video applications, such as video chat, mobile video recording and sharing, and/or video streaming for example. These video transmissions may be performed in heterogeneous environments. In various types of video transmission scenarios, such as 3-screen or N-screen, various consumer devices (e.g., PCs, smart phones, tablets, TVs, etc.) may accommodate video consumption with widely varying capabilities (e.g., in terms of computing power, memory/storage size, display resolution, display frame rate, etc.). The network and/or transmission channels may have widely varying characteristics (e.g., in terms of packet loss rate, available channel bandwidth, burst error rate, etc.). Video data may be transmitted over a combination of wired networks and/or wireless networks, which may complicate the underlying transmission channel characteristics. In such scenarios, the premise of scalable video coding (SVC) may be used to improve the quality of experience for video applications running on devices with different capabilities over heterogeneous networks. SVC may be used to encode the signal once at highest representation (e.g., temporal resolution, spatial resolution, quality, etc.). SVC may enable decoding from subsets of the video streams, depending on the rate and/or representation implemented by applications running on a client device. SVC may save bandwidth and/or storage compared to non-scalable solutions. The international video standards MPEG-2 Video, H.263, MPEG4 Visual and H.264 may have tools and/or profiles that may support some modes of scalability.

Scalable Video Coding (SVC) (e.g., an extension of H.264) may enable the transmission and/or decoding of bitstreams (e.g., partial bitstreams). The transmission and/or decoding of bitstreams may provide video services with lower temporal or spatial resolutions or reduced fidelity while retaining a relatively high reconstruction quality given the rate of the partial bitstreams. Single Loop Decoding (SLD) in an SVC decoder may set up a motion compensation loop at the layer being decoded, and may not set up motion compensation loop(s) at other lower (e.g., dependent) layer(s). For example, a bitstream may include two layers, a layer 1 (e.g., a base layer) and layer 2 (e.g., an enhancement layer). A decoder may reconstruct the layer 2 video by using, for example, decoded picture buffer and/or motion compensated prediction that may be set up for layer 2. The layer 2 video may depend on the layer 1 video. The SVC may not need a reference picture from the lower layers to be fully reconstructed. This may reduce computational complexity and memory requirements at the decoder. SLD may be implemented by using a constrained inter-layer texture prediction. For a block in a given layer, spatial texture prediction from a lower layer may be permitted if the corresponding lower layer block is coded in intra mode (e.g., referred to as restricted intra prediction). When the lower layer block is coded in intra mode, the lower layer may be decoded without the need for motion compensation operations and/or a decoded picture buffer. To further improve rate-distortion efficiency of an enhancement layer, SVC may use additional inter-layer prediction techniques such as motion vector prediction, residual prediction, mode prediction, etc. from lower layers. The SLD feature of SVC may reduce the computational complexity and memory requirements at the decoder. The decoder may incur a performance penalty by imposing the restricted intra prediction constraint. In order to achieve the desired scalable coding performance, the encoder design and computation complexity may increase, e.g., due to the use of various types of cross-layer joint rate distortion optimization. Coding of interlaced content may not be supported by the SVC, which may affect the standard's adoption by the broadcasting industry. Complications in SVC encoder and decoder design and system implementation may be the cause for limited SVC adoptions in the marketplace.

An extension of H.264, the Multi-view Video Coding (MVC) may provide view scalability. In view scalability, the base layer bitstream may be decoded, e.g., to reconstruct a 2D video. Additional enhancement layers may be decoded to reconstruct other view representations of the video signal. When views are combined together and displayed by a proper 3D display, the user may experience the 3D video with proper depth perception. FIG. 1 illustrates an example of a prediction structure of temporal and inter-layer prediction using MVC to code a stereoscopic video with a left view 52 (layer 1) and a right view 54 (layer 2). The left view video in FIG. 1 may be coded with an IBBP prediction structure, while the right view video may be coded with a PBBB prediction structure. In the right view 54, the first picture collocated with the first I picture in the left view 52 may be coded as a P picture, and the other pictures in the right view 54 may be coded as B pictures. A first prediction for a picture in the right view 54 may come from a temporal reference in the right view 54. A second prediction for a picture in the right view 54 may come from an inter-layer reference picture in the left view 52. Stereoscopic 3D TVs may be commercially available for enjoying 3D content (e.g., movies, live sports, etc.) at home. Viewers of the 3D TV may use 3D glasses to view the 3D content. Unlike SVC, MVC may not support the SLD feature. As illustrated in FIG. 1, decoding of the right view 54 (layer 2) video may require the picture in the left view 52 (layer 1) to be available, supporting motion compensation loops in the views and/or layers. MVC may include high level syntax changes, and may not include block-level changes to H.264/AVC. This may lead to ease of implementation, as the underlying MVC encoder and/or decoder logics may remain the same as a single layer H.264/AVC encoder and/or decoder, and reference pictures at slice/picture level may be configured (e.g., correctly configured) to enable MVC (e.g., by including inter-layer/ view reference pictures in enhancement layer coding). The relative ease of implementation, coupled with an explosion of 3D video content (e.g., 3D movie production and 3D live sports broadcasting) in recent years may allow the MVC to enjoy much wider commercial success compared to the SVC. The MVC may support coding of two or more views by extending the example in FIG. 1 to perform inter-layer prediction across multiple views.

The scalable enhancement of HEVC may include spatial scalability, temporal scalability, quality scalability, standards scalability, etc. Table 1 lists examples of these scalabilities. The standards scalability may refer to the case of scalability when the base layer is encoded with an earlier standard such as H.264/AVC, or MPEG2, while the one or more enhancement layers may be encoded using a more recent standard, such as the HEVC standard. Standards scalability may be aimed at providing backward compatibility for legacy content already encoded using previous standards and enhancing the quality of the legacy content with one or more enhancement layers encoded with standards including, e.g., the HEVC standard, which may provide better coding efficiency.

TABLE 1

| Scalability | Example |
|---|---|
| Spatial scalability | 720 p→1080 p |
| Quality (SNR) scalability | 35 dB→38 dB |
| Temporal scalability | 30 fps→60 fps |
| Standards scalability | H.264/AVC→HEVC |

Various designs may be provided for an HEVC scalable extension. These may include, for example, an inter-layer reference picture based framework, which may be referred to as RefIdx, and/or a block based framework, which may be referred to as IntraBL. RefIdx may add an inter-layer prediction (ILP) process to generate inter-layer reference pictures, and may not need low level changes for enhancement layer (EL) encoding or decoding process. The intraBL based framework may use block level signaling to exploit the redundancy between the BL and EL video. A CfP response may be based on the reference picture index based framework, where the scalable coding efficiency may be achieved through inter-layer processing techniques (e.g., advanced inter-layer processing techniques). The inter-layer reference picture processing may be applied at the picture level (e.g., similar to MVC) rather than at the block level. This may allow the scalable coding system to reuse (e.g., maximally reuse) the architecture and implementation of the single layer HEVC in the BL and the EL. The refIdx framework may rely on picture level inter-layer reference picture processing.

Figure 2:
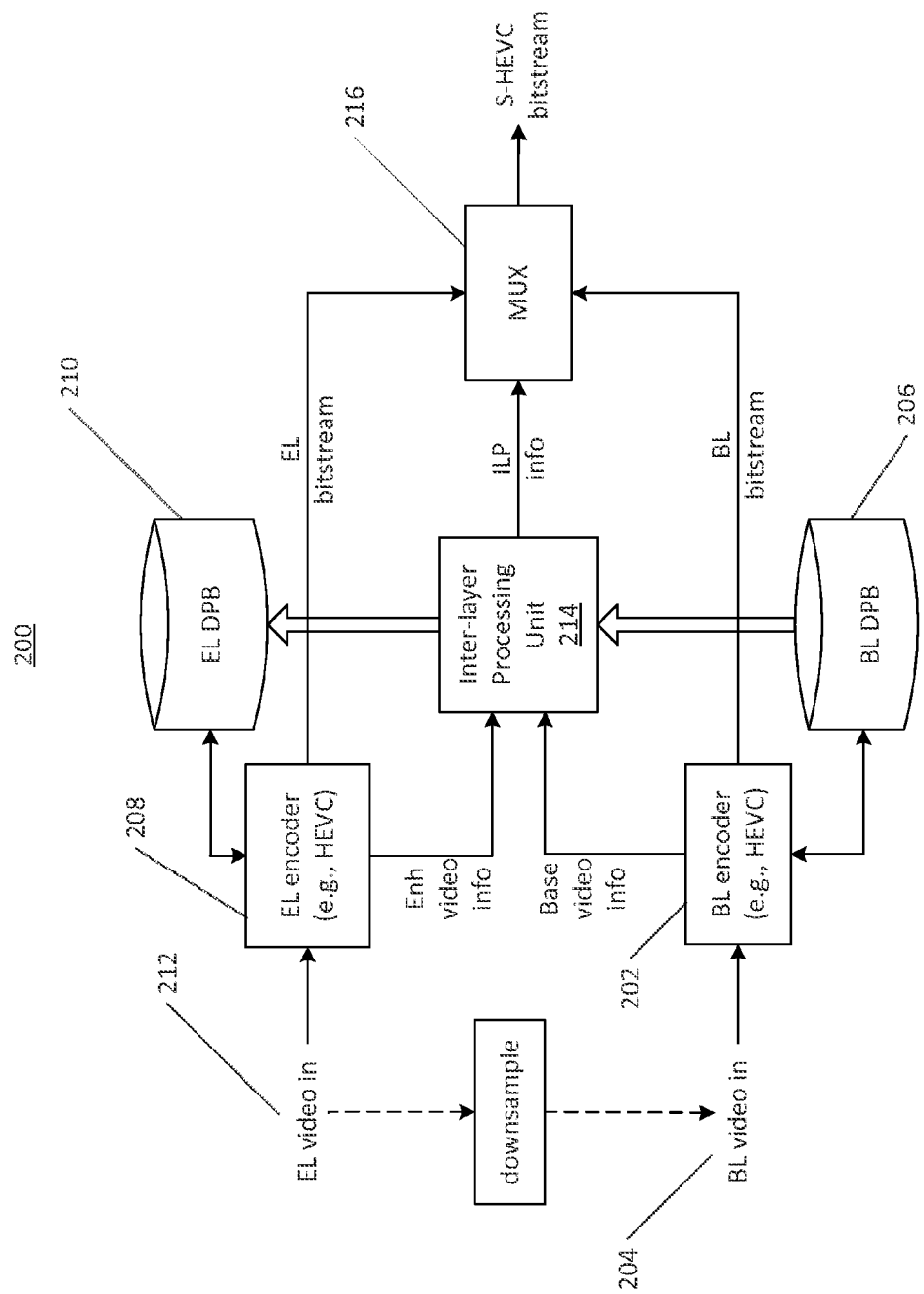
FIG. 2 is a diagram illustrating an example of a scalable encoder using picture level inter-layer reference picture processing.

FIG. 2 illustrates a two-layer scalable coding system 200 that may be built on the refIdx framework to achieve efficient scalable coding. As illustrated in FIG. 2, a BL encoder 202 (e.g., an HEVC encoder) may encode a BL video input 204 using a combination of spatial and temporal prediction, for example, as may be supported by the video coding standards (e.g., H.264, HEVC, etc.). The BL encoder 202 may establish a BL decoded picture buffer (DPB) 206 to store the reference pictures that may be utilized to perform temporal motion compensated prediction. In the EL, an EL encoder 208 may operate in a manner that may be substantially similar to the BL encoder 202. An EL DPB 210 that my provide reference pictures for prediction of an input EL video 212 by the EL encoder 208 may include reference pictures from an enhancement layer and one or more reference pictures from the DPB of its dependent layer, e.g., the BL DPB 206 in FIG. 2. In FIG. 2, an inter-layer processing unit 214 may be used to process the pictures from the BL DPB 206 before they are used to predict EL video, e.g., by processing texture information of the BL pictures and/or motion field mapping (MFM) of the BL motion vectors (MVs) for the EL temporal motion vector prediction (TMVP). A multiplexer 216 may be used, for example, after BL and EL bitstreams are generated, to combine the bitstreams into a scalable bitstream. If the inter-layer processing unit 214 makes use of inter-layer processing (ILP) parameters, the ILP information may be multiplexed into the scalable bitstream.

Figure 3:
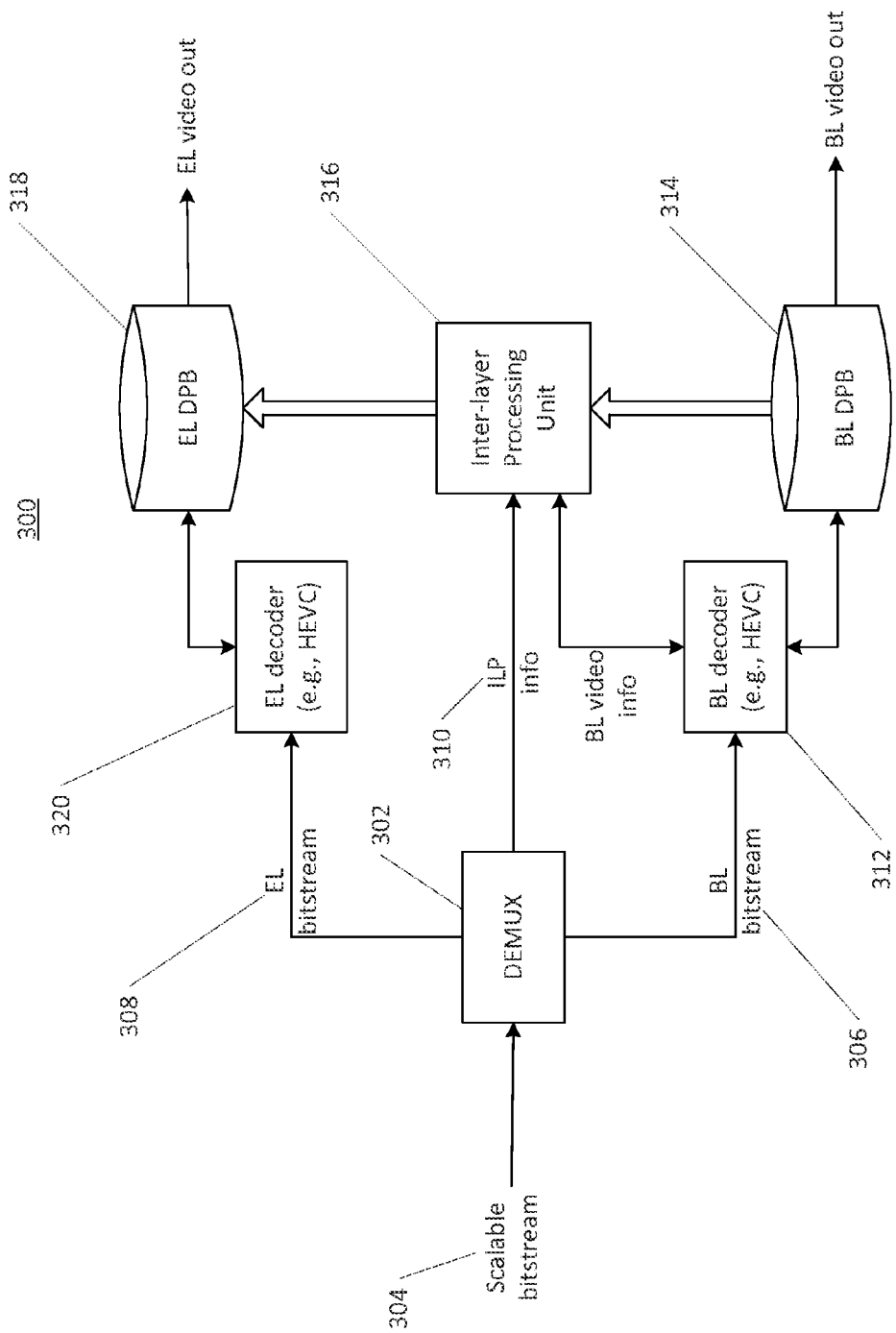
FIG. 3 is diagram illustrating an example of a scalable decoder using picture level inter-layer reference picture processing.

FIG. 3 illustrates an example of a two-layer scalable decoding system 300 with picture level ILP that may correspond to the scalable encoding system 200 of FIG. 2. In FIG. 3, a demultiplexer 302 may be used to unpack a scalable bitstream 304 into a BL bitstream 306, an EL bitstream 308, and/or ILP information 310. The BL bitstream 306 may be decoded by a BL decoder 312 to generate BL reconstructed pictures. The BL bitstream may put the BL reconstructed pictures in a BL DPB 314. The ILP information 310 may be used by an inter-layer processing unit 316 to generate inter-layer reference pictures, e.g., by processing the BL reconstructed pictures and storing them in an EL DPB 318. The EL bitstream 308 may be decoded by an EL decoder 320 using the reference pictures in the EL DPB 318 (e.g., which may include the temporal reference pictures in the EL, and the ILRPs from the BL).

The SHVC design may not include block-level changes to HEVC, as it may not support the SLD feature. The decoding of a given EL picture may require the fully reconstructed BL picture to be made available, given that the reconstructed BL signal (e.g., after upsampling) may be inserted into the EL DPB and may be used to predict the EL signal. The motion compensation loops including, e.g., the loop filter operations of the BL and EL may be executed to decode the EL picture. This may impose a large computational burden on the decoding of the EL signals, e.g., when a multiple layer SVC system with SNR scalability (e.g., where both BL and EL may have the same spatial resolution) may be utilized. An inter-layer processing method may generate inter-layer reference pictures using texture information from the EL and the motion information from the BL, referred to as hybrid inter-layer reference (H-ILR) pictures. ILR pictures may use the texture information of the BL pictures to be fully reconstructed. Generating the H-ILR pictures may involve the decoding of the BL motion information and the reconstructed EL pictures (e.g., which may be already available). Using the H-ILR pictures may reduce the computational complexity and memory access of an EL decoding process.

SLD may be based on the refIdx framework. The SLD may be used for multiple layer video coding. The SLD based implementation may be achieved by using the H-ILR picture to replace the ILR for inter-layer prediction. SLD base implementation may use the architecture and implementation of single layer encoder/decoder for multiple layer video coding. The scalable system described herein may use two layers with the HEVC standard as the underlying single-layer coding standard. Other multiple layer video systems using other types of underlying single-layer codecs may be used. Such codecs may have more than two layers, and/or may support other types of scalabilities.

Figure 4:
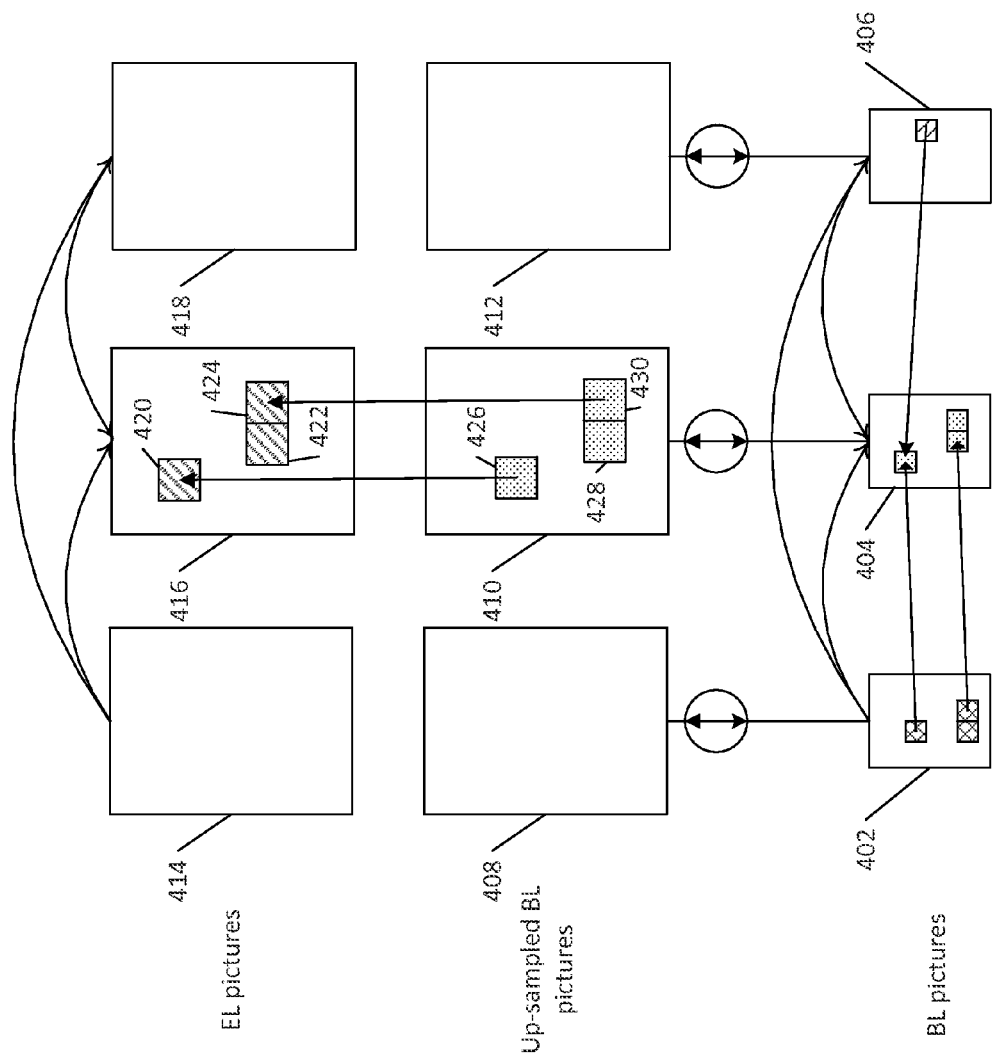
FIG. 4 is a diagram illustrating an example of an inter-layer prediction, e.g., using inter-coded base layer (BL) blocks.

A multiple layer video system may use the reconstructed BL signal for inter-layer prediction. As illustrated in FIGS. 2 and 3, to decode the EL pictures, the collocated BL picture may be decoded using the computationally complex motion compensated prediction and loop filter processing. For example, as illustrated in FIG. 4, the rectangles 402, 404, and 406 may represent the BL pictures that may be encoded based on the motion compensated prediction of a hierarchical-B structure. The rectangles 408, 410, and 412 may represent the upsampled version of the corresponding BL pictures. The rectangles 414, 416, and 418 may represent the EL pictures and may be predicted using the reference pictures from the EL and/or the upsampled reference picture from the BL. For encoding/decoding the EL picture, the blocks 420, 422, and 424 may be predicted from the collocated blocks (e.g., 426, 428, and 430) in the upsampled BL picture. At the decoder side the BL blocks 426, 428, and 430 may be upsampled for inter-layer prediction. In a refIdx framework of SHVC, the BL blocks used for the inter-layer prediction may be encoded in intra mode or inter mode. In case the BL block is coded in inter mode, the corresponding EL block may be reconstructed after executing the motion compensated prediction and loop filter process to decode the BL block. This may impose a significant complexity for the decoding of blocks in the EL picture.

Figure 5:
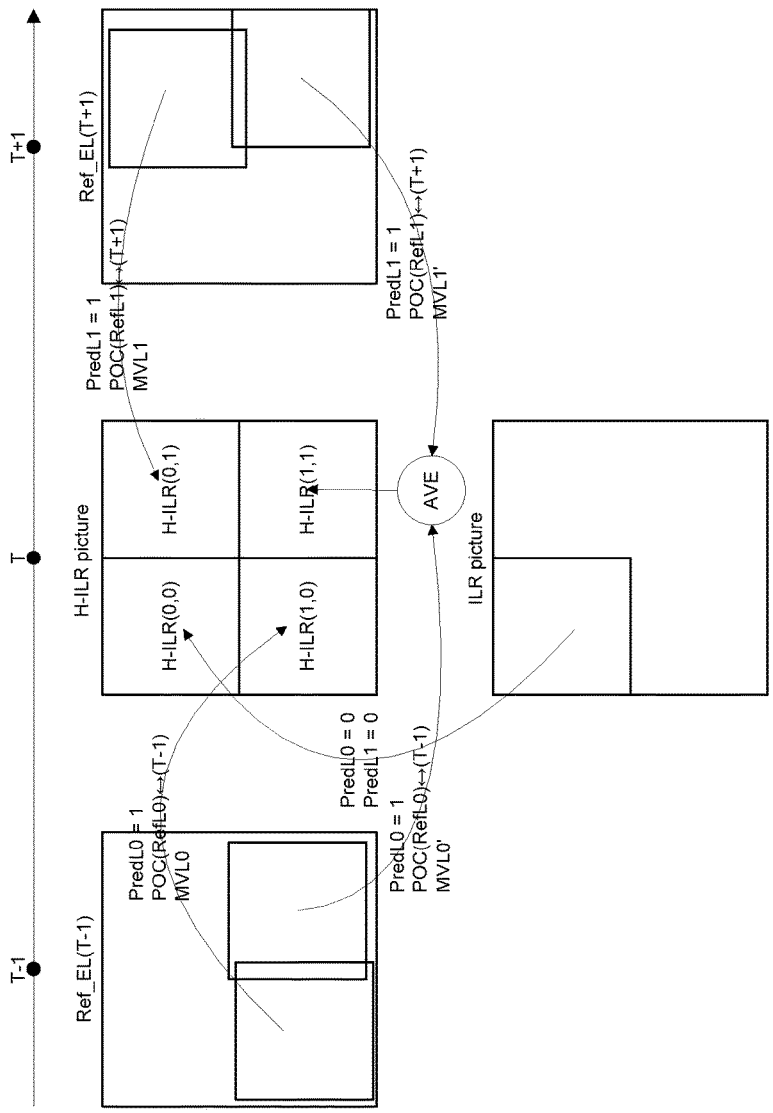
FIG. 5 is a diagram illustrating an example of forming the hybrid inter-layer reference picture, e.g., with four blocks.

The hybrid inter-layer reference (H-ILR) picture for inter-layer prediction may be generated by using the EL texture information and the mapped BL motion information. FIG. 5 illustrates an example implementation of an H-ILR picture that may include, e.g., four blocks at time instance T. In this example, the four blocks in the H-ILR picture may be formed. The top left block H-ILR(0,0) may not be predicted, e.g., from reference picture list L0 or reference picture list L1. The block H-ILR(0, 0) may be copied from an ILR block ILR(0, 0) (e.g., the upsampled reconstructed BL texture). The top right block H-ILR(0,1) may be uni-predicted from the reference picture in L1 at a time instance (T+1) (e.g., Ref_EL(T+1)) using motion vector MVL1. The bottom left block H-ILR(1,0) may be uni-predicted from the reference picture in L0 at time instance (T−1) (e.g., Ref_EL(T−1)), e.g., using motion vector MVL0. The bottom right block H-ILR(1,1) may be bi-predicted from the L0 reference picture Ref_EL(T−1), e.g., using motion vector MVL0' and the L1 reference picture Ref_EL(T+1), e.g., using motion vector MVL1'.

Because EL texture information may include some high frequency information that may be removed by the down-sampling and/or upsampling and BL quantization process to generate an ILR picture, an H-ILR picture in comparison with an ILR picture may provide better scalable coding efficiency when used to predict the EL video. The quality of an H-ILR picture may be further improved. For example, EL pictures may be coded with coarser quantization (e.g., high QP values). When coarser quantization is applied, the EL reconstructed texture may include quantization errors that may reduce the quality of H-ILR picture, and may lower the effectiveness of inter-layer texture prediction. The texture of the H-ILR pictures may include undesired coding artifacts such as blocking artifacts, ringing artifacts, and color artifacts, etc. The mapped BL motion information may not be sufficiently accurate, e.g., when applied to generate the H-ILR pictures. If one block in the H-ILR picture corresponds to a BL block that is intra predicted and has no motion information (e.g., the top left block H-ILR(0,0) in FIG. 5), the collocated block in the conventional ILR picture may be used to form the H-ILR block. Inter-layer texture prediction may be disabled by setting one or more syntax elements in the Video Parameter Set (VPS) of SHVC to particular values. The blocks in the ILR picture may not be available to construct the corresponding H-ILR blocks. An SLD for multiple layer video coding may be provided. The SLD may reduce the complexity of the EL decoding by incorporating the H-ILR into the refIdx framework. High level syntax to signal the H-ILR based SLD at the EL video encoder/decoder may be provided herein.

As illustrated in FIG. 5, in the H-ILR picture generation, the H-ILR blocks may be obtained by applying the motion compensated prediction on the EL temporal reference pictures. The quality of the H-ILR picture may depend on the quality of the corresponding EL temporal reference pictures. For example, if coarse quantization (e.g., with high QP values) is applied to code the EL pictures, the quality of the EL reconstructed texture may suffer from quantization errors (e.g., significant errors) that may in turn result in a quality loss of H-ILR pictures. To compensate for the quality loss incurred by the quantization errors of EL temporal reference pictures, the residue of the collocated BL block (e.g., upsampled, if the resolutions of the BL picture and the EL picture are different) may be added to the H-ILR block generated from the motion compensated prediction using the mapped BL motion information and the EL temporal reference pictures.

A unit block located at (bx, by) may be denoted as $B^{MF}(bx, by)$ in the mapped motion field and may include motion information, such as a flag indicating whether the prediction of $B^{MF}(bx, by)$ comes from reference picture list L0 or reference picture list L1, denoted as PredFlagLx ($B^{MF}(bx, by)$), Lx=L0, L1. The motion information may include motion vectors of the L0, L1, or L0/L1 prediction, denoted as MVLx ($B^{MF}(bx, by)$), Lx=L0, L1. The motion information may include reference picture indices of the L0, L1 or L0/L1 prediction, denoted as RefIdxLx ($B^{MF}(bx, by)$), Lx=L0, L1. If PredFlagLx ($B^{MF}(bx, by)$)=0, Lx=L0 or L1, then the value of the corresponding RefIdxLx ($B^{MF}(bx, by)$), Lx=L0, L1, may be set as invalid.

A unit block in the H-ILR picture located at (bx, by) may be denoted by $B^{H\text{-}ILR}(bx, by)$, and the residue signal of $B^{H\text{-}ILR}(bx, by)$ may be denoted by $Resi^{H\text{-}ILR}(bx, by)$. $Resi^{H\text{-}ILR}(bx, by)$ may be obtained from the residue signal of the collocated BL block (e.g., upsampled, if the resolutions are different between the BL picture and the EL picture) as per the equation (1):

$$Resi^{H\text{-}ILR}(bx,by)=UP(Resi^{BL}(\overline{bx},\overline{by})) \quad (1)$$

where UP(•) may be the upsampling operation and $Resi^{BL}(\overline{bx}, \overline{by})$ may the residue of the BL block at the collocated position ($\overline{bx}, \overline{by}$). The $B^{H\text{-}ILR}(bx, by)$ may be obtained by adding $Resi^{H\text{-}ILR}(bx, by)$ to the motion compensated prediction using the corresponding mapped motion information of $B^{MF}(bx, by)$ and the EL temporal reference pictures. When one (e.g., only one) of PredFlagL0 ($B^{MF}(bx, by)$) and PredFlagL1 ($B^{MF}(bx, by)$) is equal to 1, $B^{H\text{-}ILR}(bx, by)$ may be predicted using uni-prediction according to the equation (2).

$$B^{H\text{-}ILR}(bx,by)=Clip(Ref^{EL}(bx+mvx,by+mvy)+Resi^{H\text{-}ILR}(bx,by)) \quad (2)$$

where $Ref^{EL}$ may be the EL temporal reference picture indicated by the reference picture index RefIdxLx ($B^{MF}(bx, by)$). The Clip operation may clip the reconstructed value in correct dynamic range. When PredFlagL0 ($B^{MF}(bx, by)$)=1 and PredFlagL1 ($B^{MF}(bx, by)$)=1, $B^{H\text{-}ILR}(bx, by)$ may be predicted using bi-prediction according to the equation (3).

$$B^{H\text{-}ILR}(bx,by)=Clip((Ref_0^{EL}(bx+mvx_0,by+mvy_0)+Ref_1^{EL}(bx+mvx_1,by+mvy_1))/2+Resi^{H\text{-}ILR}(bx,by)) \quad (3)$$

Figure 6:
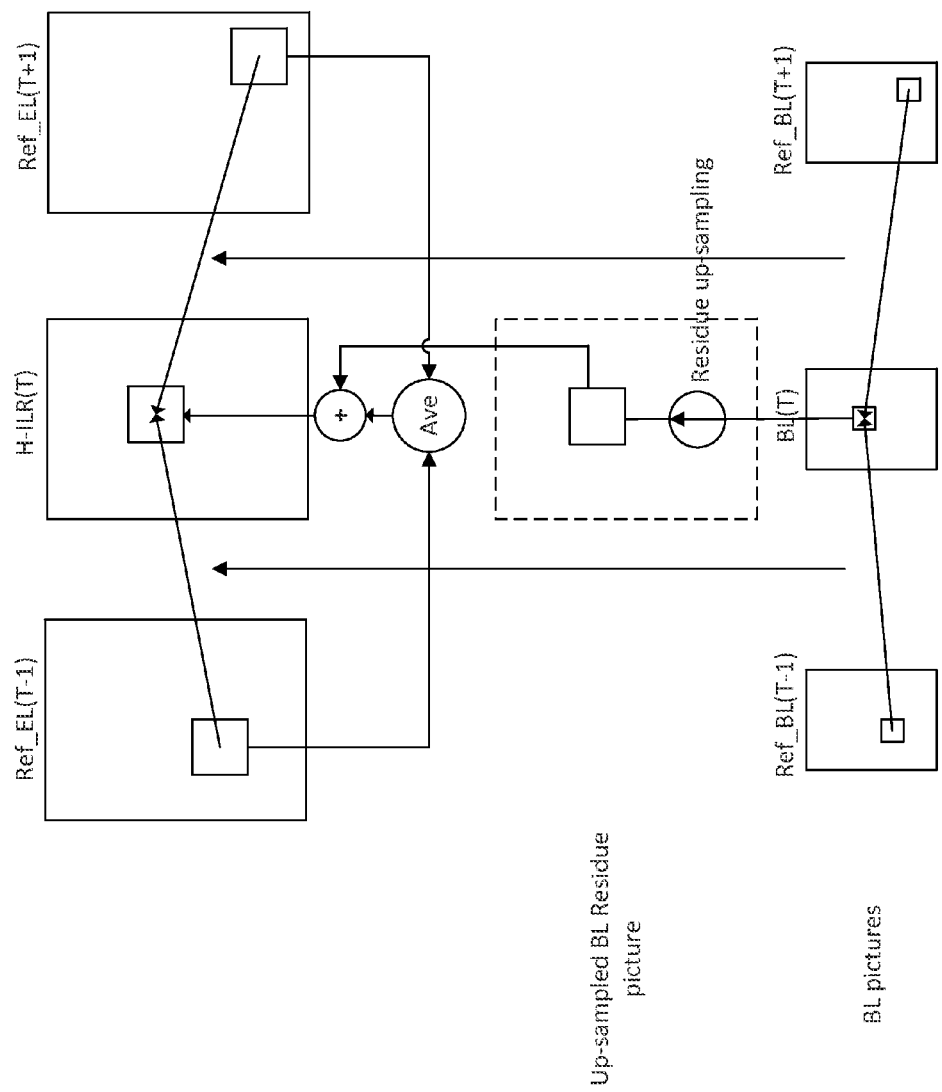
FIG. 6 is a diagram illustrating an example of forming the hybrid inter-layer reference picture with the base-layer residue.

FIG. 6 illustrates an example of generating H-ILR pictures with the added upsampled BL residue for Bi-prediction mode in spatial scalability. The quality of H-ILR pictures may be improved by applying weighted prediction to allow a scalable video encoder and/or decoder using scaling and/or offset parameters, e.g., when combining the EL motion compensated prediction signal and the BL residue signal. The weighted prediction may be applied to generate H-ILR pictures. Equations (4) and (5) may be used to generate the blocks in the H-ILR pictures:

$$B^{H\text{-}ILR}(bx,by)=Clip(a\cdot Ref^{EL}(bx+mvx,by+mvy)+b\cdot Resi^{H\text{-}ILR}(bx,by)+c) \quad (4)$$

$$B^{H\text{-}ILR}(bx,by)=Clip(a\cdot(Ref_0^{EL}(bx+mvx_0,by+mvy_0)+Ref_1^{EL}(bx+mvx_1,by+mvy_1))/2+b\cdot Resi^{H\text{-}ILR}(bx,by)+c \quad (5)$$

where the parameters a and b may be weighting factors that may adjust the weight of motion compensated EL prediction signal and the BL residue signal (e.g., upsampled residue signal), respectively. The offset parameter c may compensate for the distortion caused by BL residue quantization. To re-generate the same H-ILR for decoding, the encoder may signal the weighting factors and the offset to the decoder. The weighting factors and offset may be signaled at the picture level. The three parameters (a, b, and c) may be changed for an EL picture (e.g., for each EL picture).

The weighting factors and offset may be signaled at the region and/or block level, where a region and/or a block may use different parameters to form the corresponding H-ILR block by weighted prediction in equations (4) or (5).

One set of weighting factors (a, b) and offset c may be signaled for a reference picture in the case of uni-prediction, or for a pair of reference pictures in the case of bi-prediction. For example, if equation (4) is used, one set of (a, b, c) may be signaled for $aRef^{EL}$. If equation (5) is used, one set of (a, b, c) may be signaled for a pair (e.g., each pair) of ($Ref_0^{EL}$, $Ref_1^{EL}$).

Motion field compression may provide the motion fields of the BL and the EL in units of n×n blocks (e.g., 16×16 blocks). One or more of the samples in one or more n×n blocks of the compressed motion field may share the same motion information. The motion information may be derived from that of a 4×4 block (e.g., the top-left 4×4 block) in a corresponding 16×16 block in the BL motion field. The mapped BL motion information used to generate H-ILR pictures may be derived from the compressed motion fields of BL pictures. The quality of the generated H-ILR picture may be degraded, e.g., when the motion information incurred by the BL motion field compression is lost. For example, there may be blocking artifacts on the boundaries between neighboring n×n blocks (e.g., 16×16 blocks).

To improve the H-ILR quality, an uncompressed BL motion field may be used to derive the mapped motion information. Such derived mapped motion information may be used to generate the H-ILR pictures.

To obtain the residue signal of an H-ILR block, interpolation filters may be used to obtain the residue values at the fractional BL pixel positions. The interpolation filters of the residue signal may be the same as used in the upsampling process of texture signal in scalable video encoder/decoder. For example, the same 8-tap luma upsampling filters and 4-tap chroma upsampling filters as in SHVC may be used. Other interpolation filters may be used to reduce complexity and/or improve the performance of residue upsampling process, for example, a 2-tap bi-linear filter may be used.

Figure 7:
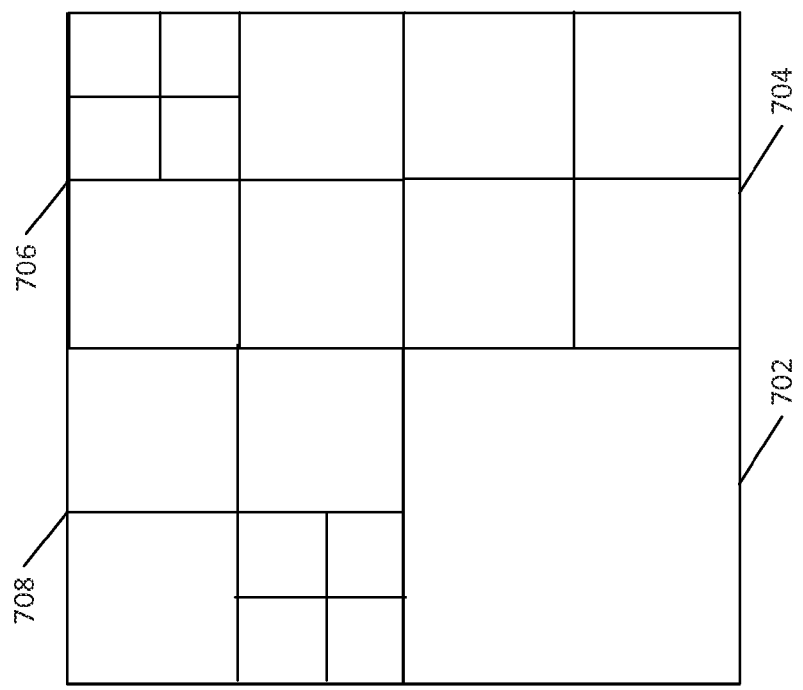
FIG. 7 is a diagram illustrating an example of sub-division of prediction units (PUs) into transform units (TUs).

As described herein, the HEVC may apply transform coding of the prediction residue. FIG. 7 illustrates an example of subdivision of PUs into transform units (TUs). As illustrated in FIG. 7, the solid lines may indicate PU boundaries whereas the dotted lines may indicate transform units (TU) boundaries. The residue block may be partitioned into multiple square TUs. The TU may have multiple sizes including, for example, 4×4, 8×8, 16×16, 32×32, etc. As illustrated in FIG. 7, the left-bottom PU 702 may represent the case of TU size being equal to PU size, and the other PUs 704, 706 and 708 may represent the case of splitting a PU into multiple TUs. With the different TU sizes, filtering the residue signal across TU boundaries may produce a disturbing signal component. The upsampling of the BL residue signal may be constrained on a TU basis in order to ensure that there is no filtering operation applied across TU boundaries.

As described herein, the mapped BL motion information used to generate H-ILR picture may not be accurate for EL motion compensated prediction. The texture of the H-ILR picture may include undesired coding artifacts, such as blocking artifacts, ringing artifacts, and/or color artifacts. The loop filters, for example, the de-blocking filter and sample adaptive offset (SAO) may be applied to the hybrid ILR picture to improve the picture quality for accurate inter-layer prediction. The boundary strength values used in deblocking may be the same as those boundary strength values used in BL deblocking (e.g., upsampled to address different BL and EL resolutions); and the same SAO parameters as those sent in the BL or different SAO parameters from those sent in the BL may be applied to the SAO process of the H-ILR picture (e.g., upsampled).

Figure 8:
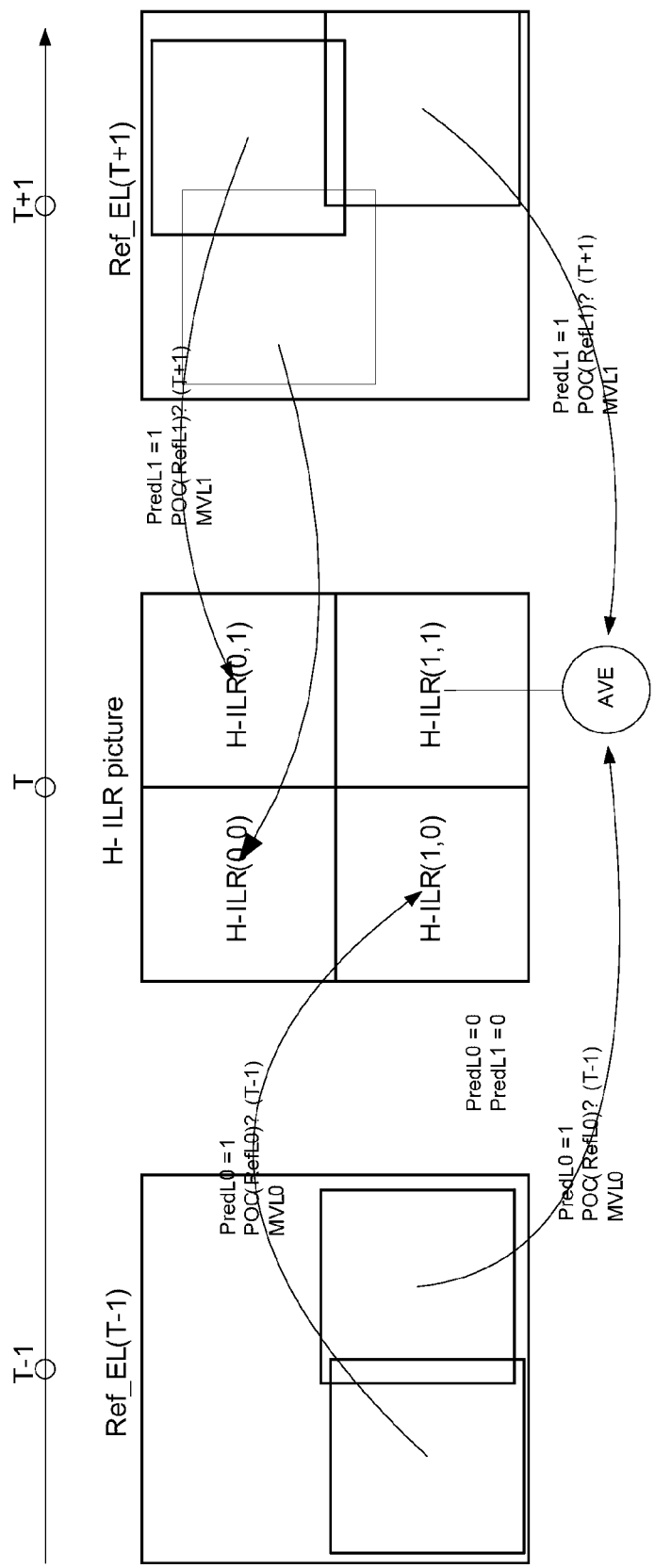
FIG. 8 is a diagram illustrating an example of forming a hybrid inter-layer reference picture with four blocks when an inter-layer reference picture may not be available.

As illustrated in FIG. 5, the top left block H-ILR(0,0) may correspond to a BL block that may be intra coded and may have no motion information. The corresponding collocated block in the conventional ILR picture may be used to form the H-ILR block. The inter-layer texture prediction may be disabled from the high level syntax. The ILR picture may not be available to construct the corresponding H-ILR blocks. An H-ILR block whose reference block may be predicted from the ILR picture may derive its motion from its neighboring motion field information. Motion compensation may be applied using the motion information derived from the H-ILR blocks. For example, the motion information may be derived by copying (e.g., directly copying) from one or more of its neighboring blocks. FIG. 8 illustrates an example where an ILR picture may not be available to construct H-ILR(0, 0). In this example, the motion field information from its neighboring block H-ILR (0, 1) may be copied and the hybrid block H-ILR(0, 0) may be formed by applying motion compensated prediction using the motion vector and reference picture used by H-ILR(0, 1). The H-ILR blocks may be constructed by intra prediction, for example, if the BL intra mode and its neighboring pixels are available.

Figure 9:
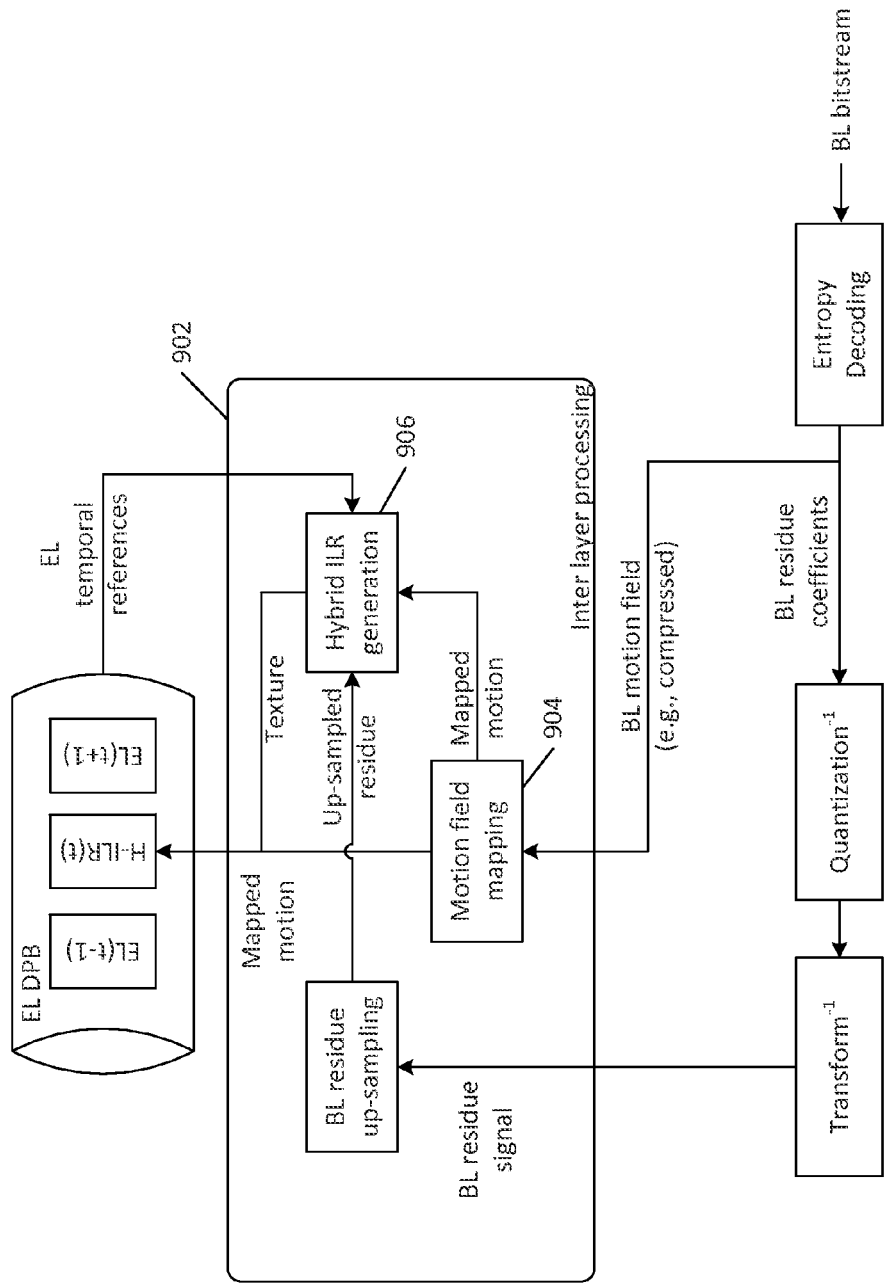
FIG. 9 is a diagram illustrating an example of a single loop decoding using an improved hybrid inter-layer reference (H-ILR) picture.

Single Loop Decoding (SLD) using a hybrid inter-layer reference picture may be provided. FIG. 9 illustrates an example of SLD using the improved H-ILR pictures for the refIdx framework of SHVC. An inter-layer processing unit 902 supported by the SHVC framework may include a full motion compensation loop in the BL (e.g., which may store each of the BL reference pictures), texture upsampling to generate the ILR picture, and motion field mapping 904. The SLD may use a functional block 906 that may generate the H-ILR picture to replace the block of generating the ILR picture. The H-ILR generation process may take the mapped BL motion information, the upsampled BL residue signal, and the EL temporal reference pictures as inputs, and may provide the H-ILR picture as output, e.g., according to the generation process. Because the BL motion information and the BL residue information used to produce the H-ILR picture may be obtained (e.g., directly) by parsing the BL bitstream and applying inverse quantization and inverse transform to the quantized BL residual, the decoding of the EL pictures may be operated without performing motion compensation and loop filtering processes to obtain the fully reconstructed BL pictures. This may reduce the computational complexity and memory bandwidth requirement of the decoder (e.g., because the BL DPB in FIGS. 2 and 3 may not be established), and may be an efficient SLD solution of SHVC. Compared to the SLD solution of H.264 SVC that may change the block level operations of a single layer encoder/decoder to fulfill SLD criteria, the SLD using H-ILR may be compatible with the refIdx framework design of SHVC. The H-ILR based SLD may not need block level changes.

Figure 10:
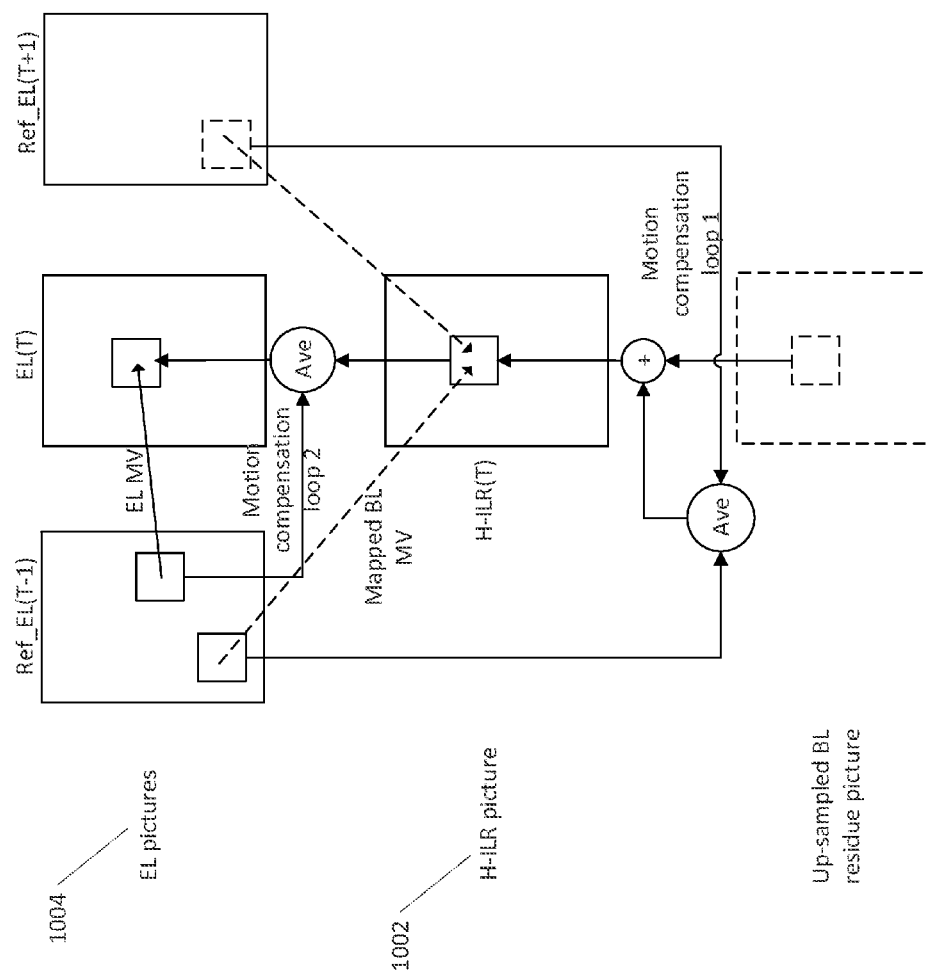
FIG. 10 is a diagram illustrating an example of a bi-prediction using both enhancement layer prediction and H-ILR prediction signals (e.g., when the H-ILR is bi-predicted).

FIG. 10 illustrates an example of bi-prediction using temporal EL prediction and H-ILR prediction signals, where H-ILR may be bi-predicted. To achieve high inter prediction efficiency, the HEVC may enable a bi-prediction mode to exploit the temporal redundancy between neighboring pictures. A PU of a B-Slice may be predicted from two motion compensated prediction signals obtained from two reference pictures, e.g., one from the reference picture list L0 and the other from the reference picture list L1, respectively (e.g., the two reference pictures may be the same physical reference picture in the DPB). Using the SLD solution of SHVC, a bi-predicted PU in the EL may be formed by combining (e.g., averaging) two prediction signals from the temporal EL references, or by combining (e.g., averaging) two prediction signals. One of the prediction signals may be from an H-ILR reference picture 1002 and the other prediction signal may be from a temporal EL reference 1004. The EL decoder may apply two motion compensation operations to obtain the two prediction signals and apply averaging, for example, if both prediction signals are from temporal EL references. The H-ILR block may be bi-predicted (for example, as shown in the block labeled H-ILR(1, 1), as illustrated in FIG. 5) and the two prediction signals may be averaged, for example, if one prediction signal is from an H-ILR reference picture and the other prediction signal is from a temporal EL reference. As illustrated by way of example in FIG. 10, a plurality (e.g., three) of motion compensation signals may be combined to generate the bi-predicted H-ILR block, for example, if the H-ILR block is bi-predicted. A signal (e.g., the third signal) may represent the EL prediction that may be averaged with the bi-predicted H-ILR block. This may impose an undesirable computational burden on the decoding of the EL video. To solve the complexity issue, application of bi-prediction between an H-ILR block and an EL temporal prediction block may be disallowed, when the H-ILR block is bi-predicted. To further reduce the EL decoding complexity, the application of bi-prediction between an H-ILR block and an EL temporal prediction block may be disallowed regardless of whether the H-ILR block is uni-predicted or bi-predicted. When the H-ILR block is used as reference for prediction, it may be used in uni-prediction mode.

As described herein, an H-ILR picture (e.g., each H-ILR picture) may be generated by using the compressed BL motion field where the granularity of storing the BL motion information may be restricted to an n×n block size (e.g., 16×16 block size). Such H-ILR picture generation may cause loss of motion information. In the uncompressed motion field, there may be one or more prediction units (PUs). A PU may have its own (e.g., unique) motion information (e.g., including MVs and/or a reference picture index). The motion information of the PU may be different from its neighboring PUs in the same 16×16 region. The granularity of the uncompressed motion field may be as low as 4×4 blocks.

Figure 11:
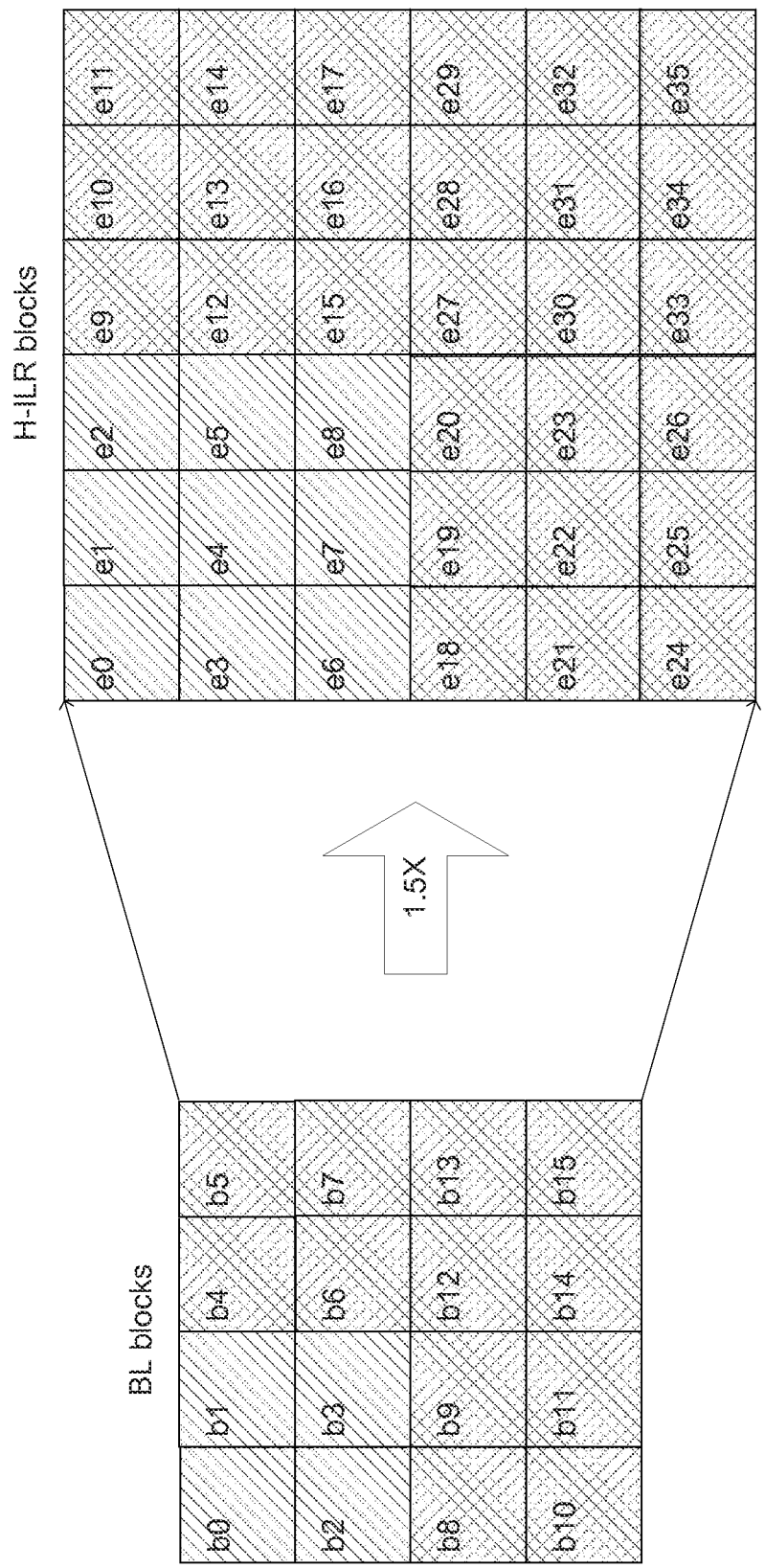
FIG. 11 is a diagram illustrating an example relationship between BL blocks and H-ILR blocks.

The motion information of a 16×16 block may be obtained from a 4×4 block (e.g., that of the 4×4 block in the top-left corner of the 16×16 block). FIG. 11 illustrates an example of the original motion information of a BL 16×16 block. As illustrated in FIG. 11, the four 4×4 blocks $b_0$, $b_1$, $b_2$, and $b_3$ in the top-left corner may be intra-coded (e.g., with no motion information). One or more of the other 4×4 blocks, e.g., $b_4$, $b_5$, ..., $b_{15}$ may be inter-coded. The 16×16 BL block may be regarded as intra-coded with no motion information after motion field compression. The corresponding block in the H-ILR picture may be copied from the reconstructed BL texture. In SLD, one or more (e.g., all) of the inter-coded BL blocks may not be reconstructed, e.g., because the BL motion compensation operations may be skipped. The H-ILR blocks, e.g., $e_9$, $e_{10}$, ..., $e_{35}$ that correspond to the inter-coded BL blocks may not be generated for the inter-layer prediction of the EL. The 16×16 block in the compressed motion field may indicate an intra-mode, but some samples in the 16×16 block may be unavailable, e.g., because they may reside in inter-coded PUs during BL coding.

The H-ILR block may be constructed by deriving its motion information from one or more of its neighboring blocks in the H-ILR picture, e.g., if one or more of the blocks neighboring the problem H-ILR block are inter-coded. The derived motion information may be used to apply motion compensation, e.g., using the EL temporal reference pictures.

The problem H-ILR block may be constructed from its neighboring pixels by intra-prediction using the corresponding intra mode of the 16×16 BL block, e.g., if the neighboring pixels needed for intra prediction are available in the H-ILR picture.

The encoder may be prevented from using the samples of the problem H-ILR block for the inter-layer prediction of the EL. The corresponding H-ILR block during the decoding process of SLD may not be generated. The changes may be introduced in the encoder by constraining the H-ILR blocks used for the EL coding. No block level changes may be made to the decoding process. A bitstream restriction may be imposed such that one or more (e.g., each) of the conformant bitstreams may not be allowed to use inter-layer prediction, e.g., when one or more samples in the corresponding H-ILR block are not available.

High level syntax signaling of SLD may be provided. In the SLD SHVC described herein, based on H-ILR pictures, an SHVC decoder may decode the EL video without fully reconstructing the BL pictures. The SLD implementation may reduce memory bandwidth requirement, computational complexity, memory usage, and/or power consumption when decoding the EL video. Whether a given video layer may be decoded by a single loop decoder or by applying multiple loop decoder may be indicated. e.g., via high level signaling. The decoder may allocate (e.g., optimally allocate) memory and computational resources prior to decoding a video layer. The SLD may be indicated, for example, through profile or tier definition. For example, a dedicated profile IDC and/or tier flag may be used to indicate the SLD type. The SLD may be signaled at high level by dependency indication.

Syntax elements (e.g., new syntax elements) may signal ILR based sample prediction, inter-layer syntax prediction, and/or H-ILR based sample prediction in a Video Parameter Set (VPS). These elements may be signaled separately. The same syntax elements may be used to signal the proposed H-ILR based SLD scheme. Table 2 illustrates example syntax elements of a VPS extension.

TABLE 2

| | Descriptor |
|---|---|
| vps_extension( ) { | |
| ... | |
|   direct_dep_type_len_minus3 | ue(v) |
|   for( i = 1; i <= vps_max_layers_minus1: i+ ) | |
|     for( j = 0; j < i; j++ ) { | |
|       if( direct_dependency_flag[ i ][ j ] ) | |
|         direct_dependency_type[ i ][ j ] | u(v) |
|       If( RIHybridSamplePredEnableFlag[i][j] ){ | |
|         vps_bl_resi_hybrid_pred_enable_flag[i][j] | u(1) |
|         vps_ deblocking_hybrid_pred_enable_flag[i][j] | u(1) |
|         vps_sao_hybrid_pred_enable_flag[i][j] } | u(1) |
|       } | |
|     } | |
| } | | where a direct_dep_type_len_minus3 syntax element+3 may specify the number of bits of a direct_dependency_type [i][j] syntax element. The direct_dependency_type[i][j] syntax element may be used to derive the number and flag used for the ILR based sample prediction, inter-layer syntax prediction, and/or the H-ILR based sample prediction, such as NumRISamplePredRefLayers[i], NumRIMotionPredRefLayers[i], NumRIHybridSamplePredLayers[i], RISamplePredEnableFlag[i][j], RIMotionPredEnableFlag[i][j], and/or RIHybridSamplePredEnableFlag[i][j].

A vps_bl_resi_hybrid_pred_enable_flag[i][j] syntax element may be equal to 1, which may indicate that the BL residue signal may be used to generate the H-ILR sample prediction of layer j for the inter-layer prediction of layer i. The vps_bl_resi_hybrid_pred_enable_flag[i][j] syntax element may be equal to 0, which may indicate that the BL residue signal may not be used to generate the H-ILR sample prediction of layer j for the inter-layer prediction of layer i. If the vps_bl_resi_hybrid_pred_enable_flag[i][j] syntax element is not present, it may be inferred to be 0.

A vps_deblocking_hybrid_pred_enable_flag[i][j] syntax element may be equal to 1, which may indicate that a deblocking filter is used to generate the H-ILR sample prediction of layer j for the inter-layer prediction of layer i. The vps_deblocking_hybrid_pred_enable_flag[i][j] syntax element may be equal to 0, which may indicate that deblocking filter is not used to generate the H-ILR sample prediction of layer j for the inter-layer prediction of layer i. If the vps_deblocking_hybrid_pred_enable_flag[i][j] syntax element is not present, it may be inferred to be 0.

A vps_sao_hybrid_pred_enable_flag[i][j] syntax element may be equal to 1, which may indicate that an SAO process may be used to generate the H-ILR sample prediction of layer j for the inter-layer prediction of layer i. The vps_sao_hybrid_pred_enable_flag[i][j] syntax element may be equal to 0, which may indicate that the SAO process may not be used to generate the H-ILR sample prediction of layer j for the inter-layer prediction of layer i. If the vps_sao_hybrid_pred_enable_flag[i][j] syntax element is not present, it may be inferred to be 0.

The derivation may be as follows:

```
for( i = 1; i <= vps_max_layers_minus1; i++ ) {
    NumRISamplePredRefLayers[ i ] = 0
    NumRIMotionPredRefLayers[ i ] = 0
    for( j = 0; j < i; j++ )
        if( direct_dependency_flag[ i ][ j ] = = 1 ) {
            RISamplePredEnabledFlag[ i ][ j ] = ( (
            direct_dependency_type[ i ][ j ] + 1) & 1 )
            NumRISamplePredRefLayers[ i ] +=
            RISamplePredEnabledFlag[ i ][ j ]
            RIMotionPredEnabledFlag[ i ][ j ] = ( ( (
            direct_dependency_type[ i ][ j ] + 1) & 2 ) >>
1 )
            NumRIMotionPredRefLayers[ i ] +=
            RIMotionPredEnabledFlag[ i ][ j ]
            RIHybridSamplePredEnabledFlag[ i ][ j ] = ( ( (
            direct_dependency_type[ i ][ j ] + 1) & 4 )
>> 2 )
            NumRIHybridSamplePredRefLayers[ i ] +=
            RIHybridSamplePredEnabledFlag[ i ][ j ]
        }
}
```

A SHVC decoder may indicate if a layer may be decoded using SLD or multiple loop decoding, e.g., by checking the number of the reference layers that may be used for the conventional ILR sample prediction, and the reference layers that may be used for the H-ILR sample prediction. IfNumRISamplePredRefLayers[i] is non-zero (e.g., NumRISamplePredRefLayers[i]=1), regardless of the value of NumRIHybridSamplePredLayers[i], the ILR pictures may be added into the DPB of the $i^{th}$ layer for inter-layer prediction. The decoding of the pictures in the $i^{th}$ layer may be the reference pictures of the dependent lower layers to be fully reconstructed (e.g., multiple loop decoding may be performed). If NumRISamplePredRefLayers[i]=0 and NumRIHybridSamplePredLayers[i] is non-zero (for example, NumRIHybridSamplePredLayers[i]=i), the H-ILR pictures may be used for decoding the $i^{th}$ layer, but the ILR pictures may be omitted. SLD may be applied to decode the $i^{th}$ layer pictures. If NumRISamplePredRefLayers[i]=0 and NumRIHybridSamplePredLayers[i]=0, neither the ILR sample prediction nor the H-ILR sample prediction may be applied to predict the pictures in the $i^{th}$ layer.

The $i^{th}$ layer may be an SLD-enabled layer, for example, if NumRISamplePredRefLayers[i]=0 and NumRIHybridSamplePredLayers[i] is non-zero. One or more (e.g., all) of the reference layers of the $i^{th}$ layer may be SLD-enabled, e.g., for the $j^{th}$ layers on which the $i^{th}$ SLD-enabled layer depends, NumRISamplePredRefLayers[j]=0 may be true.

When the H-ILR base SLD is enabled, one additional syntax element may be added into a sequence parameter set (SPS) or a slice header, e.g., to indicate if H-ILR sample prediction is used. If the flag is signaled in SPS, it may indicate whether H-ILR sample prediction is enabled for the pictures in a sequence. If the flag is signaled in a slice header, it may indicate whether H-ILR sample prediction is enabled for the slice. If H-ILR sample prediction is enabled, extra syntax elements may be signaled to specify the corresponding reference layer used for generating an H-ILR picture, and/or to specify if the BL residue and/or loop filters (e.g., deblocking and/or SAO) may be enabled to generate the H-ILR prediction. The additional syntax elements that indicate how to generate the H-ILR prediction may be added to the Video Parameter Set, Sequence Parameter Set (SPS) or SPS extension, Picture Parameter Set (PPS) or PPS extension, or the slice segment headers. Table 3 illustrates an example of the syntax elements in a slice header.

An interlayer_hybrid_sample_pred_enable_flag syntax element may be equal to 1, which may indicate that the H-ILR sample prediction may be performed for a slice. The interlayer_hybrid_sample_pred_enable_flag syntax element may be equal to 0, which may indicate that the H-ILR sample prediction may not be performed for a slice. When the interlayer_hybrid_sample_pred_enable_flag syntax element is not present, it may be inferred to be equal to 0.

A hybrid_collocated_ref_layer_idx syntax element may specify the reference layer index of the collocated picture that may be used for the H-ILR sample prediction. If the hybrid_collocated_ref_layer_idx syntax element is not present, it may be inferred to be equal to 0.

A bl_resi_hybrid_sample_pred_enable_flag syntax element may be equal to 1, which may indicate that the BL residue signal of the collocated picture in reference layer hybrid_collocated_ref_layer_idx may be used for the H-ILR sample prediction of a slice. The bl_resi_hybrid_sample_pred_enable_flag syntax element may be equal to 0, which may indicate that the BL residue signal of the collocated picture in reference layer hybrid_collocated_ref_layer_idx may not be used for the H-ILR sample prediction of a slice. When the bl_resi_hybrid_sample_pred_enable_flag syntax element is not present, it may be inferred to be 0.

A deblocking_hybrid_sample_pred_enable_flag syntax element may be equal to 1, which may indicate that a deblocking filter may be used for the H-ILR sample prediction of a slice. The deblocking_hybrid_sample_pred_enable_flag syntax element may be equal to 0, which may indicate that a deblocking filter may not be used for the H-ILR sample prediction of a slice. When the deblocking_hybrid_sample_pred_enable_flag syntax element is not present, it may be inferred to be 0.

A sao_hybrid_sample_pred_enable_flag syntax element may be equal to 1, which may indicate that the SAO may be used for the H-ILR sample prediction of a slice. The sao_hybrid_sample_pred_enable_flag syntax element may be equal to 0, which may indicate that the SAO may not be used for the H-ILR sample prediction of a slice. When the sao_hybrid_sample_pred_enable_flag syntax element is not present, it may be inferred to be 0.

Constraints on whether bi-prediction of H-ILR and temporal EL reference pictures is enforced may be signaled by adding appropriate flags, e.g., at the high level, such as in VPS, SPS/SPS extension, PPS/PPS extension, etc. When the values of these flags signaled at the high level indicate that such constraints are enforced, it may be a bitstream restriction at the block level that, for the blocks (e.g., prediction units) in the EL pictures/slices, a prediction mode that may use a combination of the H-ILR and any temporal EL reference picture may not be present.

Figure 12A:
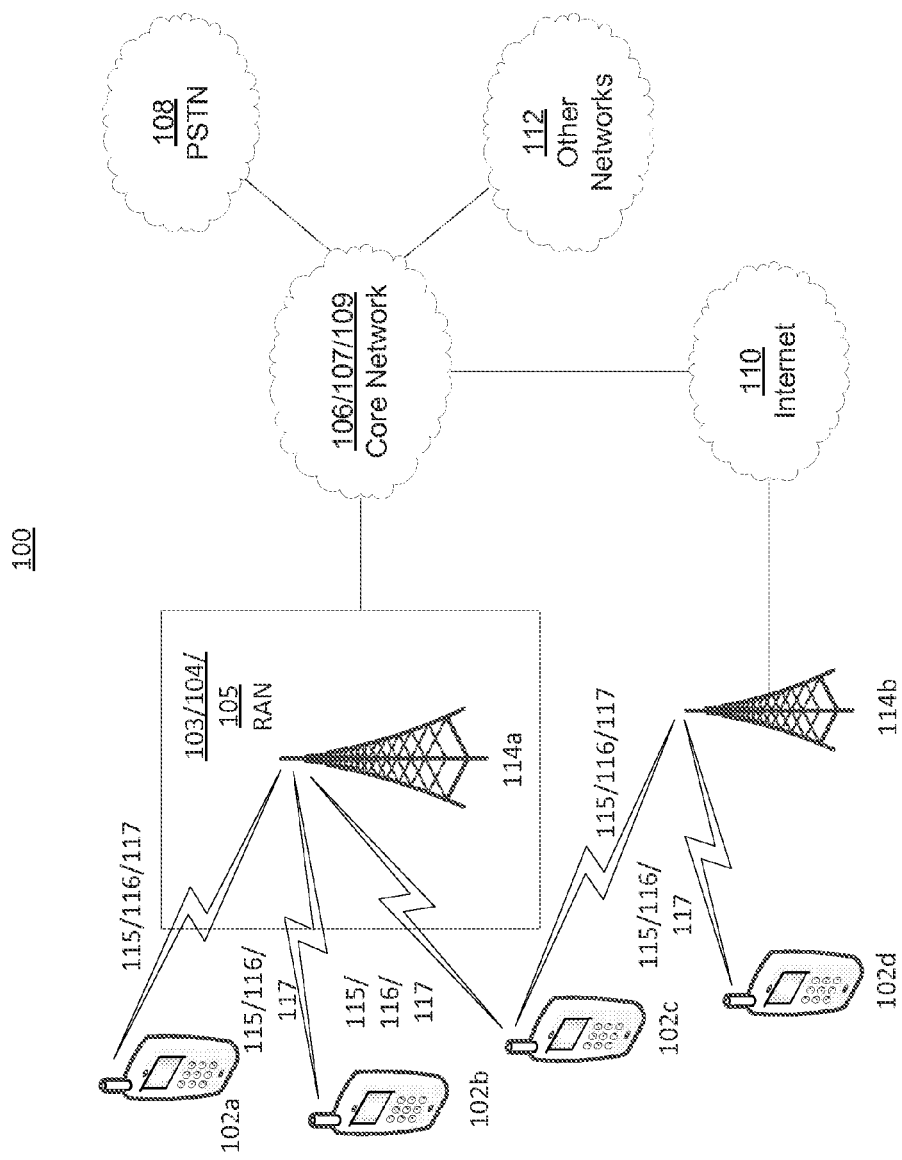
FIG. 12A is a system diagram of an example communications system in which one or more disclosed embodiments may be implemented.

FIG. 12A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 12A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any

TABLE 3

|  | Descriptor |
|---|---|
| slice_segment_header( ) { | |
| ... | |
|   if( slice_temporal_mvp_enabled_flag ) { | |
|     AltCollocatedIndicationFlag = 0 | |
|     if( nuh_layer_id > 0 && | |
|   NumRIMotionPredRefLayers[ LayerIdInVps[ nuh_layer_id ] ] ) { | |
|       alt_collocated_indication_flag | u(1) |
|       AltCollocatedIndicationFlag = alt_collocated_indication_flag | |
|     } | |
|     if( AltCollocatedIndicationFlag ) | |
|       if( NumRIMotionPredRefLayers[ LayerIdInVps[ nuh_layer_id ] ] > 1 ) | |
|         collocated_ref_layer_idx | ue(v) |
|     else { | |
|       if( slice_type = = B ) | |
|         collocated_from_l0_flag | u(1) |
|       if( ( collocated_from_l0_flag && num_ref_idx_l0_active_minus1 > 0 ) | |
|       ( !collocated_from_l0_flag && num_ref_idx_l1_active_minus1 > 0 ) ) | |
|         collocated_ref_idx | ue(v) |
|     } | |
|   } | |
|   if( nuh_layer_id > 0 && | |
| NumRIHybridSamplePredRefLayers[ LayerIdInVps[ nuh_layer_id ] ] ) { | |
| interlayer_hybrid_sample_pred_enable_flag | u(1) |
|     if( interlayer_hybrid_sample_pred_enable_flag && | |
|   NumRIHybridSamplePredRefLayers[ LayerIdInVps[ nuh_layer_id ] ] > 1 ) { | |
|       hybrid_collocated_ref_layer_idx | ue(v) |
|   if(vps_bl_—resi_hybrid_pred_enable_flag[ LayerIdInVps[ nuh_layer_id ] ] | |
|   [ hybrid_collocated_ref_layer_idx ] | |
|     bl_resi_hybrid_sample_pred_enable_flag | u(1) |
|   if(vps_deblocking_hybrid_pred_enable_flag[ LayerIdInVps[ nuh_layer_id ] ] | |
|   [ hybrid_collocated_ref_layer_idx ] | |
|     deblocking_hybrid_sample_pred_enable_flag | u(1) |
|   if(vps_sao_hybrid_pred_enable_flag[ LayerIdInVps[ nuh_layer_id ] ] | |
|   [ hybrid_collocated_ref_layer_idx ] | |
|     sao_hybrid_sample_pred_enable_flag | u(1) |
|     } | |
| } | |

The mechanisms described herein (e.g., single loop decoding based multiple layer video coding) may be used, for example, in any of the networks or suitable network elements described herein. For example, single loop decoding described herein may be applicable to a WTRU 102a-d or any other network element processing video data.

type of device configured to operate and/or communicate in a wireless environment. By way of example, the WTRUs 102a, 102b, 102c, 102d may be configured to transmit and/or receive wireless signals and may include wireless transmit/receive unit (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiment, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 12A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 12A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over Internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 12A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP Internet protocol suite. The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 12A may be configured to communicate with the base station 114a, which may employ a cellular-based radio technology, and with the base station 114b, which may employ an IEEE 802 radio technology.

Figure 12B:
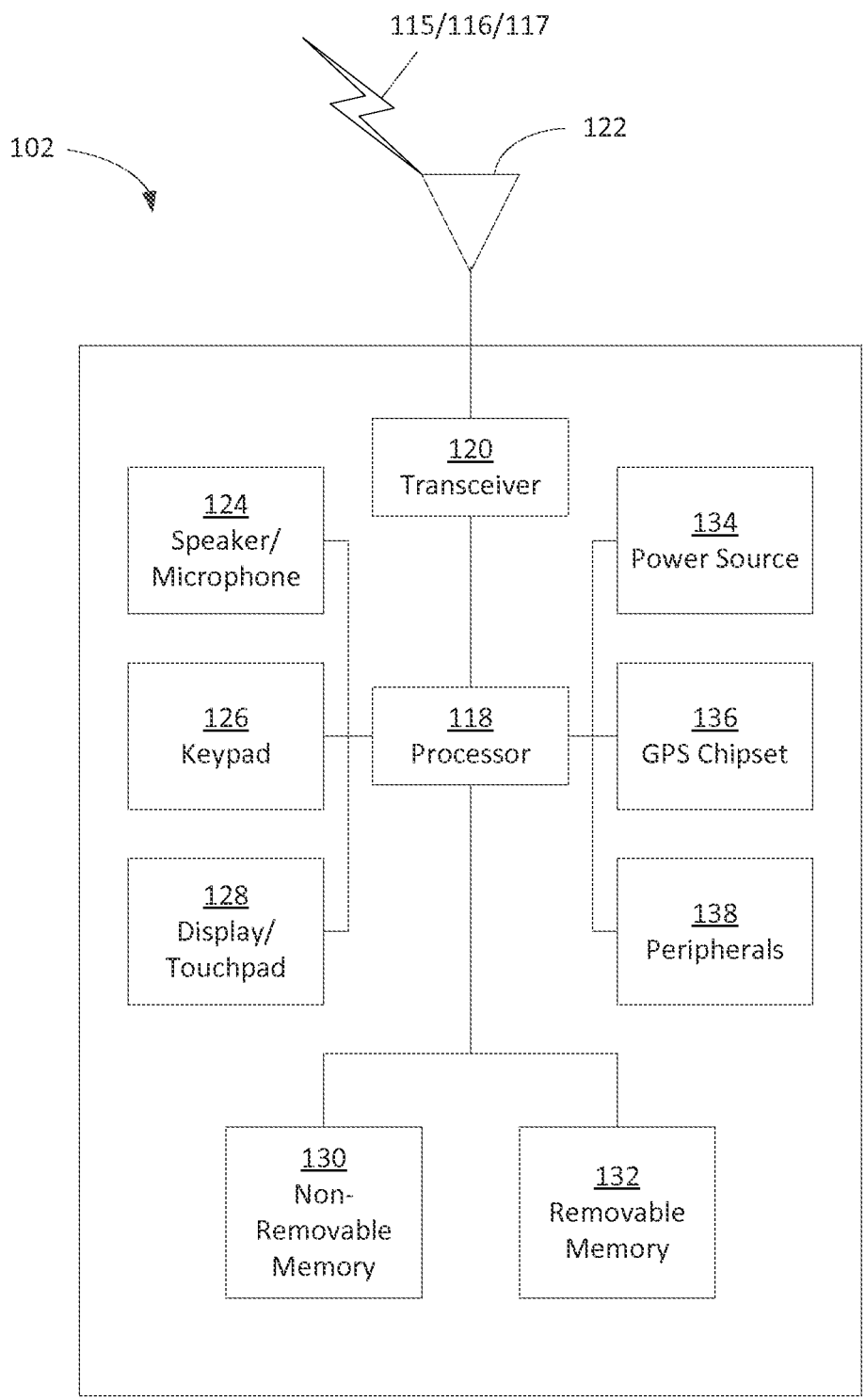
FIG. 12B is a system diagram of an example wireless transmit/receive unit (WTRU) that may be used within the communications system illustrated in FIG. 12A.

FIG. 12B is a system diagram of an example WTRU 102. As shown in FIG. 12B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or each of the elements depicted in FIG. 12B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 12B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 12B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12C:
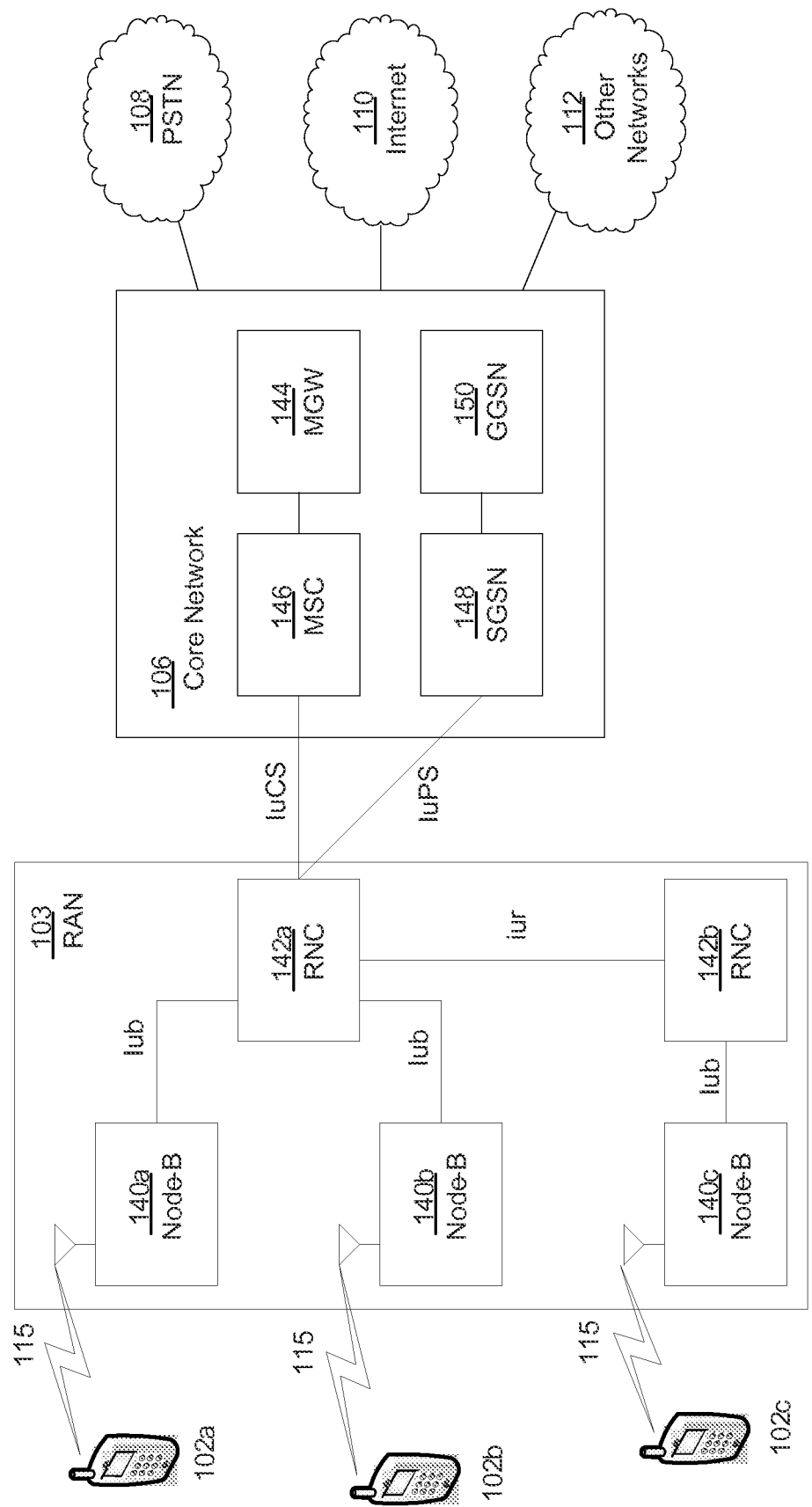
FIG. 12C is a system diagram of an example radio access network and an example core network that may be used within the communications system illustrated in FIG. 12A.

FIG. 12C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 12C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 12C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro diversity, security functions, data encryption, and the like.

The core network 106 shown in FIG. 12C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 12D:
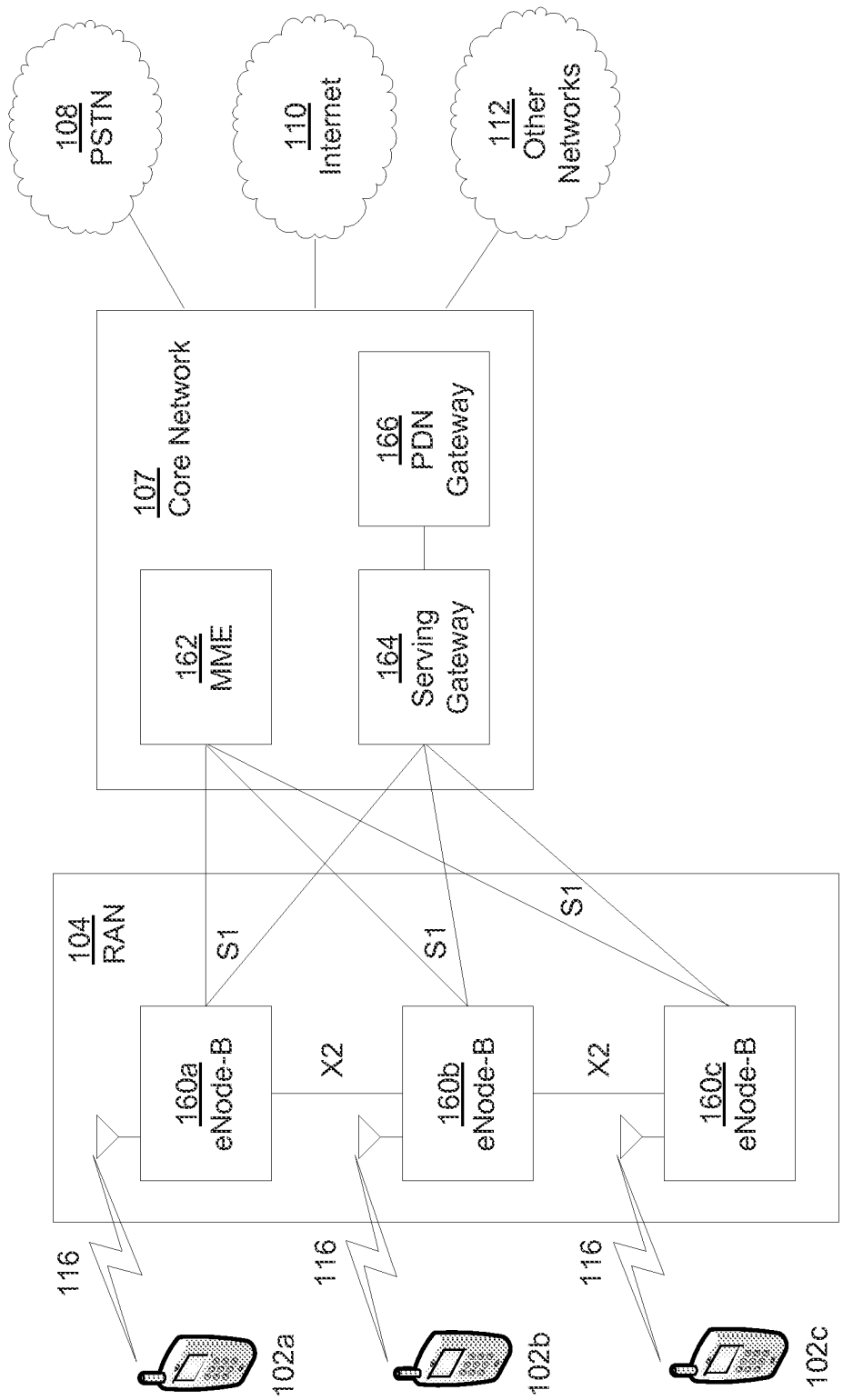
FIG. 12D is a system diagram of an example radio access network and an example core network that may be used within the communications system illustrated in FIG. 12A.

FIG. 12D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 8D, the eNode-Bs 160a, 160b, 160c may communicate with one another over an X2 interface.

The core network 107 shown in FIG. 8D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 12E:
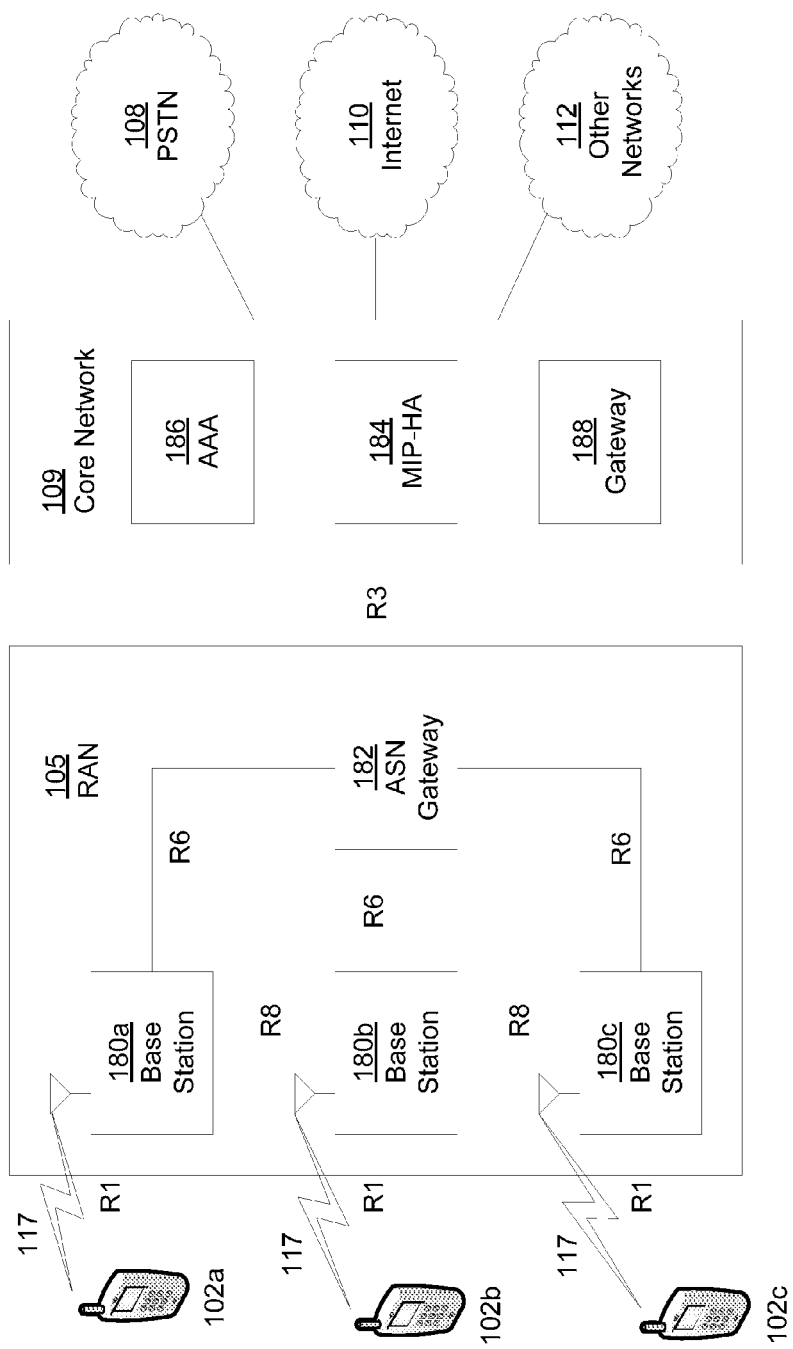
FIG. 12E is a system diagram of an example radio access network and an example core network that may be used within the communications system illustrated in FIG. 12A.

FIG. 12E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 12E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 12E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 12E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A decoding method comprising:
receiving a video bitstream comprising a first layer and a second layer;
processing first-layer residue information and first-layer texture information associated with the first layer of the video bitstream;
generating a hybrid inter-layer reference (H-ILR) picture based on first-layer motion information, the processed first-layer residue information, and second-layer texture information, wherein when a first H-ILR block of the H-ILR picture corresponds to an intra-coded first layer block, the first H-ILR block is reconstructed based on the processed first-layer texture information associated with the first layer, wherein a second H-ILR block is reconstructed based on the processed first-layer residue information, the first-layer motion information, and the second-layer texture information associated with a second-layer reference picture; and
storing the generated H-ILR picture in a second layer decoded picture buffer (DPB).

2. The method of claim 1, wherein the first layer comprises a base layer and the second layer comprises an enhancement layer.

3. The method of claim 1, wherein the first-layer motion information comprises at least one of a variable indicating one or more reference picture lists on which a prediction of the first-layer motion information is based, one or more motion vectors, or one or more reference picture indices.

4. The method of claim 1, wherein the first-layer motion information is derived from at least one of a compressed first-layer motion field or an uncompressed first-layer motion field.

5. The method of claim 1, wherein the second-layer reference picture is associated with one or more H-ILR blocks in the H-ILR picture.

6. The method of claim 1, further comprising:
partially reconstructing the first layer; and
decoding the second layer based on the partially reconstructed first layer.

7. The method of claim 1, wherein the H-ILR picture is generated based on a weighted prediction based on at least one of second-layer motion compensated prediction information or the processed first-layer residue information.

8. The method of claim 1, further comprising:
parsing a first layer bitstream;
de-quantizing a first layer residual by applying an inverse quantization to the first layer bitstream; and
applying an inverse transform to the de-quantized first layer residual.

9. The method of claim 5, wherein the second H-ILR block of the H-ILR picture is reconstructed by:
deriving motion information for the second H-ILR block from the first-layer motion information associated with one or more neighboring H-ILR blocks in the H-ILR picture, wherein the one or more neighboring H-ILR blocks are inter-coded; and
performing motion compensation for the second H-ILR block based on the derived motion information for the second H-ILR block from the first-layer motion information, the corresponding second-layer texture information associated with the second-layer reference picture, and the corresponding processed first-layer residue information.

10. A single loop decoding method comprising:
receiving a video bitstream comprising a first layer and a second layer;
processing first-layer residue information and first-layer texture information associated with the first layer of the video bitstream;
generating a hybrid inter-layer reference (H-ILR) picture based on first-layer motion information, the processed first-layer residue information, and second-layer texture information, wherein when a first H-ILR block of the H-ILR picture corresponds to an intra-coded first layer block, the first H-ILR block is reconstructed based on the processed first-layer texture information associated with the first layer, wherein a second H-ILR block is reconstructed based on the processed first-layer residue information, the first-layer motion information, and the second-layer texture information associated with a second-layer reference picture; and
storing the generated H-ILR picture in a second layer decoded picture buffer (DPB).

11. A decoder comprising:
a processor; and
a memory comprising instructions that, when executed by the processor, cause the decoder to
receive a video bitstream comprising a first layer and a second layer;
process first-layer residue information and first-layer texture information associated with the first layer of the video bitstream;
generate a hybrid inter-layer reference (H-ILR) picture based on first-layer motion information, the processed first-layer residue information, and second-layer texture information, wherein when a first H-ILR block of the H-ILR picture corresponds to an intra-coded first layer block, the first H-ILR block is reconstructed based on the processed first-layer texture information associated with the first layer, wherein a second H-ILR block is reconstructed based on the processed first-layer residue information, the first-layer motion information, and the second-layer texture information associated with a second-layer reference picture; and
store the generated H-ILR picture in a second layer decoded picture buffer (DPB).

12. The decoder of claim 11, wherein the first layer comprises a base layer and the second layer comprises an enhancement layer.

13. The decoder of claim 11, wherein the first-layer motion information comprises at least one of a variable indicating one or more reference picture lists on which a prediction of the first-layer motion information is based, one or more motion vectors, or one or more reference picture indices.

14. The decoder of claim 11, wherein the first-layer motion information is derived from at least one of a compressed first-layer motion field or an uncompressed first-layer motion field.

15. The decoder of claim 11, wherein the second-layer reference picture is associated with one or more H-ILR blocks in the H-ILR picture.

16. The decoder of claim 11, the memory storing further instructions for:
partially reconstructing the first layer; and
decoding the second layer based on the partially reconstructed first layer.

17. The decoder of claim 11, wherein the H-ILR picture is generated based on a weighted prediction based on at least one of second-layer motion compensated prediction information or the processed first-layer residue information.

18. The decoder of claim 11, the memory storing further instructions for:
parsing a first layer bitstream;
de-quantizing a first layer residual by applying an inverse quantization to the first layer bitstream; and
applying an inverse transform to the de-quantized first layer residual.

19. The decoder of claim 15, wherein the memory storing further instructions to reconstruct the second H-ILR block of the H-ILR picture by:
deriving motion information for the second H-ILR block from the first-layer motion information associated with one or more neighboring H-ILR blocks in the H-ILR picture, wherein the one or more neighboring H-ILR blocks are inter-coded; and
performing motion compensation for the second H-ILR block based on the derived motion information for the second H-ILR block from the first-layer motion information, the corresponding second-layer texture information associated with the second-layer reference picture, and the corresponding processed first-layer residue information.

20. A single loop decoder comprising:
a processor; and
a memory comprising instructions that, when executed by the processor, cause the single loop decoder to
receive a video bitstream comprising a first layer and a second layer;
process first-layer residue information and first-layer texture information associated with the first layer of the video bitstream;
generate a hybrid inter-layer reference (H-ILR) picture based on first-layer motion information, the processed first-layer residue information, and second-layer texture information, wherein when a first H-ILR block of the H-ILR picture corresponds to an intra-coded first layer block, the first H-ILR block is reconstructed based on the processed first-layer texture information associated with the first layer, wherein a second H-ILR block is reconstructed based on the processed first-layer residue information, the first-layer motion information, and the second-layer texture information associated with a second-layer reference picture; and store the generated H-ILR picture in a second layer decoded picture buffer (DPB).

* * * * *